United States Patent
Sonobe et al.

[11] Patent Number: 6,012,538
[45] Date of Patent: Jan. 11, 2000

[54] DRIVING UNIT FOR AN ELECTRIC MOTOR DRIVEN BICYCLE

[75] Inventors: Hiroyuki Sonobe; Hisayoshi Takahashi; Katsuhiko Suzuki; Katsutoshi Ohta; Masashi Hirabayashi, all of Nagoya, Japan

[73] Assignee: Mitsubishi Heavy Industries, Ltd., Tokyo, Japan

[21] Appl. No.: 08/937,804

[22] Filed: Sep. 25, 1997

[30] Foreign Application Priority Data

Sep. 26, 1996 [JP] Japan ................................. 8-254174
Apr. 16, 1997 [JP] Japan ................................. 9-098697
Jun. 16, 1997 [JP] Japan ................................. 9-158257

[51] Int. Cl.⁷ ................................................ B62K 11/00
[52] U.S. Cl. ........................ 180/220; 180/65.8; 180/65.6
[58] Field of Search ................................. 180/204, 205, 180/220, 65.1, 65.2, 65.6, 65.7, 65.8, 218, 219

[56] References Cited

U.S. PATENT DOCUMENTS

| | | | |
|---|---|---|---|
| 5,805,767 | 7/1999 | Macer et al. | 180/220 |
| 5,819,868 | 10/1998 | Noike et al. | 180/220 |
| 5,901,807 | 5/1999 | Tseng | 180/220 |

FOREIGN PATENT DOCUMENTS

| | | |
|---|---|---|
| 0636537A1 | 2/1995 | European Pat. Off. . |
| 0700826A1 | 3/1996 | European Pat. Off. . |
| 0729881A1 | 9/1996 | European Pat. Off. . |
| 0743238A1 | 11/1996 | European Pat. Off. . |
| 3117415A1 | 11/1982 | Germany . |
| 9420303U | 3/1995 | Germany . |
| 56-149277A | 11/1981 | Japan . |
| 740878A | 2/1995 | Japan . |

*Primary Examiner*—Richard M. Camby

[57] ABSTRACT

In a driving unit for an electric motor driven bicycle, a motor (31) has an output shaft coaxial with a crank shaft (39) of a pedal. A planet roller reducer (40) has a sun roller shaft coincident with the output shaft. Through the planet roller reducer (40) and a two-stage reducing gear mechanism (50) for further reducing the output of the planet roller reducer (40), a torque of the motor (31) is transmitted to a driving chain sprocket (4). Provided that the torque of the motor (31) exceeds a predetermined pedaling torque level, the torque is transmitted to the driving chain sprocket (4).

20 Claims, 17 Drawing Sheets ns to the rear wheel. Thus, the rear wheel is driven by a combination of pedaling torque by human power and rotation torque by the driving motor 6.

DRIVING UNIT FOR AN ELECTRIC MOTOR DRIVEN BICYCLE

BACKGROUND OF THE INVENTION

1. Field of the Invention

This invention relates to a driving unit for an electric motor driven bicycle and, in particular, to a speed reducing unit for a bicycle with an auxiliary drive and a pedaling torque detector contained in the reducing unit.

2. Description of the Prior Art

For example, a conventional auxiliary power unit for a bicycle is disclosed in JPA-56-149277 and will hereinafter be described with reference to FIGS. 1 and 2. As illustrated in the figures, the bicycle has a rear hub 1 and first and second free wheels 2 and 3 coupled thereto. The first free wheel 2 is connected to a driving chain sprocket 4 through a first chain 5. The second free wheel 3 is connected through a second chain 8 to a chain sprocket 7 coupled to an output shaft of a driving motor 6.

To the intermediate portion of the first chain 5, a torque detector 9 is attached which is for detecting the magnitude of tensile strength applied to the first chain 5 to convert the magnitude into an electric quantity (for example, electric resistance or electric capacitance). Upon running the bicycle, pedaling force is produced by a rider and transmitted through pedals 14, pedal cranks 15, and the driving chain sprocket 4 to the first chain 5 which is then subjected to the tensile strength. The tensile strength is detected as a rotation angle of a rotary shaft of the torque detector 9.

The rotary shaft of the torque detector 9 is rotated by the rotation angle corresponding to the pedaling force. Upon start, acceleration, or hill climbing, the pedal 14 is strongly kicked and the pedaling force is increased. When the rotary shaft of the torque detector 9 is rotated by an angle greater than a predetermined angle, the driving motor 6 is energized to rotate the chain sprocket 7 coupled to the output shaft of the driving motor 6. The rotation of the chain sprocket 7 causes the rotation of the second free wheel 3 through the second chain 8 to drive a rear wheel. Thus, the rear wheel is driven by a combination of pedaling torque by human power and rotation torque by the driving motor 6.

In the conventional auxiliary power unit described above, the second chain 8 is wound around an output end thereof, i.e., the output shaft of the driving motor 6. With this structure, the power unit inevitably protrudes beyond the width of the bicycle and the extent of protrusion is not small. In addition, the output shaft is cantilevered and, therefore, easily bent. It is therefore difficult to keep a balance between left and right sides of the bicycle. Since the power unit is located near to the rear wheel, weight distribution is too large on the rear wheel and too small on a front wheel. This often results in unstable running operation of the bicycle.

In view of the above, the auxiliary power unit is desired to be compact in its axial direction (widthwise direction of the bicycle), to keep good balance in weight distribution between the front and the rear wheels, and to be easy in handling. To satisfy such requirements, various proposals have been made. For example, JP-A 40878/1995 discloses an electric driving power unit arranged coaxially with a crank shaft. An electric motor is located frontward of the crank shaft to improve the balance in weight distribution of a body of the bicycle. The power unit contain pedaling torque detecting means and a one-way clutch. However, this electric driving power unit is still disadvantageous in view of weight and cost.

Generally, an electric motor driven bicycle having an auxiliary power unit is mainly driven by human power and is desired to provide a rider with the feeling of an ordinary pedal-driven bicycle. Therefore, the power unit is required to be light in weight, low in cost, and easy in operation of a control system.

SUMMARY OF THE INVENTION

It is, therefore, an object of this invention to provide a driving unit for an electric motor driven bicycle, which is light in weight, low in cost, and easy in operation of a control system.

Other objects of this invention will become clear as the description proceeds.

According to one aspect of the present invention, a driving unit for an electric motor driven bicycle. The driving unit comprises a motor having an output shaft concentric with a crank shaft of a pedal, a planet roller reducer having a sun roller made of the output shaft of the motor, a two-stage gear reducer for further reducing the rotation of a reduced shaft of the planet roller reducer, a first one-way clutch interposed in a power transmission path of the two-stage gear reducer, a driving chain sprocket having a first gear which is concentric with the crank shaft and engaged with an output shaft of the two-stage gear reducer, a second gear equal in pitch diameter to the first gear, supported through a bearing on the crank shaft of the pedal, and having a second one-way clutch for transmitting the rotation of the crank shaft to the driving chain sprocket, an angular displacement mechanism which includes an elastic member provided in the first gear and a protruding member protruding from the second gear to be engaged with the elastic member and which is for converting the magnitude of a pedaling torque into angular displacement following deformation of the elastic member, and an angular displacement detecting mechanism for detecting the angular displacement produced in the angular displacement mechanism. In the driving unit, the output shaft of the motor has an output torque which is controlled in correspondence to the magnitude of the pedaling torque.

In the driving unit, the angular displacement mechanism may be arranged to comprise a plurality of long hole portions to which long holes are made to penetrate the first gear to both side surfaces thereof and arranged at an equal interval in a circumferential direction, a plurality of compression springs received in the long holes in one-to-one correspondence, and the protruding member formed on the second gear to be engaged with the compression springs only in a single rotational direction. The compression springs are compressed and shortened in proportion to the pedaling torque to represent relative angular displacement between the first and the second gears.

In the driving unit, it may be arranged that the compression springs are applied with an initial pressure so as to produce no relative angular displacement between the first and the second gears while the pedaling torque is small, thereby restricting the range of energization by the motor.

In the driving unit, it may be arranged that the angular displacement detecting mechanism comprises a pair of gears engaged with the first and the second gears, respectively, and rotated on a common axis, a plurality of V groove cams fixed on annular side surfaces of the pair of gears and arranged at an equal interval in a circumferential direction to confront one another, a compression spring urged to press the V groove cams against one another, and a plurality of rollers each of which is interposed and held in each of parallelopiped cavities defined between cam surfaces of the V groove cams. Every confronting ones of the V groove cams are offset from each other, upon occurrence of relative angular displacement between the gears, to force the rollers to climb upward along the cam surfaces so that both gears are separated from each other in an axial direction by a moving distance which is converted by a sliding plate and a lever into displacement to be measured by a displacement detector to produce a motor output control signal.

According to another aspect of the present invention, a driving unit for an electric motor driven bicycle is provided. The driving unit comprises a motor having an output shaft concentric with a crank shaft of a pedal, a planet roller reducer having a sun roller made of the output shaft of the motor, a two-stage gear reducer for further reducing the rotation of a reducing shaft of the planet roller reducer, a first one-way clutch interposed in a power transmission path of the two-stage gear reducer, a driving chain sprocket having a first gear at a final stage which is concentric with the crank shaft and engaged with an output shaft of the two-stage gear reducer, a second gear equal in pitch diameter to the first gear, supported through a bearing on the crank shaft of the pedal, and having a second one-way clutch for transmitting the rotation of the crank shaft to the driving chain sprocket, and a torque detecting mechanism including third and fourth gears arranged on a common axis to be engaged with the first and the second gears, respectively. The torque detecting mechanism is responsive to a pedaling torque transmitted through the two pairs of gears for producing axial displacement proportional to a transmission torque between the third and the fourth gears. In the driving unit, the output shaft of the motor has an output torque which is controlled in correspondence to the magnitude of the pedaling torque.

In the driving unit, it may be arranged that the torque detecting mechanism comprises a plurality of V groove cams fixed on annular side surfaces of the third and the fourth gears and arranged at an equal interval in a circumferential direction to confront one another, a compression spring urged to press the V groove cams against one another, and a plurality of rollers each of which is interposed and held in each of parallelopiped cavities defined between cam surfaces of the V groove cams. Every confronting ones of the V groove cams is offset from each other, upon occurrence of relative angular displacement between the third and the fourth gears in response to the pedaling torque, to force the rollers to climb upward along the cam surfaces so that the third and the fourth gears are separated from each other in an axial direction by a moving distance which is converted by a sliding plate and a lever into displacement to be measured by a displacement detector to produce a motor output control signal.

In the driving unit, it may be arranged that the compression spring is applied with an initial pressure so as to produce no relative angular displacement between the first and the second gears while the pedaling torque is small, thereby restricting the range of energization by the motor.

In the driving unit, it may be arranged that the angular displacement detecting mechanism comprises a helical groove shaft having opposite ends rotatably supported by bearings and a plurality of helical grooves formed in a cylindrical shaft portion extending between the bearings, a third gear fixed on the helical groove shaft and engaged with the first gear, a fourth gear engaged with the second gear and loosely fitted on the helical groove shaft to be slidable both in a rotational direction and in an axial direction, the fourth gear having a plurality of dead-ended grooves equal in number to the helical grooves of the helical groove shaft and formed inside of a stepped portion of an inner loose-fit cylinder of the fourth gear in parallel to axial lines of the helical grooves, a plurality of balls equal in number to the helical grooves and engaged with both the helical grooves of the helical groove shaft and the dead-ended grooves of the fourth gear, ball holding means for holding the balls inside of the dead-ended grooves of the fourth gear, urging means for urging the fourth gear towards the third gear, and detecting means for detecting a moving distance of the fourth gear in the axial direction to produce a motor output control signal.

In the driving unit, it may be arranged that a combination of the ball holding means, the urging means, and the detecting means comprises an annular plate fitted to the stepped portion of the inner cylinder of the fourth gear and a compression spring arranged between the annular plate and a seating plate fixed to the helical groove shaft and urged in a direction of pressing the fourth gear towards the third gear. The fourth gear is angularly offset from the third gear upon occurrence of relative angular displacement between the first and the second gears in correspondence to the magnitude of the pedaling torque so that the fourth gear is pushed by the balls moving along the helical grooves to move in an axial direction by a moving distance. The moving distance is picked up by a lever in contact with the side surface of the fourth gear as displacement which is detected by a displacement detector to produce a motor output control signal.

In the driving unit, it may be arranged that the angular displacement detecting mechanism comprises a helical groove shaft having opposite ends rotatably supported by bearings and a plurality of helical grooves formed in a cylindrical shaft portion extending between the bearings, a third gear fixed on the helical groove shaft and engaged with the first gear, and a fourth gear engaged with the second gear and loosely fitted on the helical groove shaft to be slidable both in a rotational direction and in an axial direction, the fourth gear having a plurality of protrusions equal in number to the helical grooves of the helical groove shaft and having a helical angle equal to that of the helical grooves, the protrusions being formed in an inner loose-fit cylinder of the fourth gear to be engaged with the helical grooves. The angular displacement detecting mechanism further comprises detecting means for detecting, when the fourth gear is angularly offset from the third gear upon occurrence of a relative angular displacement between the first and the second gears in correspondence to the magnitude of the pedaling torque. A moving distance of the fourth gear moves along the helical grooves to produce a motor output control signal.

In the driving unit, it may be arranged that the detecting means comprises a lever in contact with the side surface of the fourth gear, the lever picking up the moving distance of the fourth gear moving along the helical grooves as displacement which is detected by a displacement detector to produce the motor output control signal.

In the driving unit, it may be arranged that the angular displacement detecting mechanism further comprises a ball bearing externally fitted over a stepped cylindrical shaft portion of the fourth gear, a bearing holder ring externally fitted over the ball bearing, a compression spring arranged between the bearing holder ring and a casing and urged in a direction of pressing the fourth gear towards the third gear, and a rotation stopper shaft fixed to the casing in parallel to the helical shaft to inhibit rotation of the bearing holder ring. The fourth gear is angularly offset from the third gear upon occurrence of a relative angular displacement between the first and the second gears in correspondence to the magnitude of the pedaling torque so that the fourth gear is pushed by the balls moving along the helical grooves and moved in an axial direction by a moving distance. The moving distance is picked up, through the ball bearing and the bearing holder ring, by a lever in contact with the side surface of the fourth gear as displacement which is detected by a displacement detector to produce a motor output control signal.

In the driving unit, it may be arranged that the angular displacement detecting mechanism further comprises a ball bearing externally fitted over a stepped cylindrical shaft portion of the fourth gear, a bearing holder ring externally fitted over the ball bearing, a compression spring arranged between the bearing holder ring and a casing and urged in a direction of pressing the fourth gear towards the third gear, and a rotation stopper shaft fixed to the casing in parallel to the helical shaft to inhibit rotation of the bearing holder ring. The fourth gear is angularly offset from the third gear upon occurrence of relative angular displacement between the first and the second gears in correspondence to the magnitude of the pedaling torque so that the fourth gear is moved in an axial direction by a moving distance. The moving distance is picked up, through the ball bearing and the bearing holder ring, by a lever in contact with the side surface of the fourth gear as displacement which is detected by a displacement detector to produce a motor output control signal.

In the driving unit, it may be arranged that the angular displacement detecting mechanism comprises a serration shaft having opposite ends rotatably supported by bearings and a cylindrical shaft portion extending between the bearings with a helical serration portion formed on the cylindrical shaft portion, a third gear fixed on the serration shaft and engaged with the first gear, a fourth gear engaged with the second gear with a bush internally fitted in an inner cylinder of the fourth gear so that the fourth gear is loosely fitted to the serration shaft to be slidable both in the rotational direction and in the axial direction, the fourth gear being provided with an inner serration formed in the inner cylinder with a helical angle equal to that of the helical serration portion to be engaged with the helical serration portion of the serration shaft, a ball bearing externally fitted over a stepped cylindrical shaft portion of the fourth gear, a bearing holder ring externally fitted over the ball bearing, a compression spring arranged between the bearing holder ring and a casing and urged in a direction of pressing the fourth gear towards the third gear, and a rotation stopper shaft fixed to the casing in parallel to the helical shaft to inhibit rotation of the bearing holder ring. The fourth gear is angularly offset from the third gear upon occurrence of a relative angular displacement between the first and the second gears in correspondence to the magnitude of the pedaling torque so that the fourth gear is moved along the helical serration by a moving distance. The moving distance is picked up, through the ball bearing and the bearing holder ring, by a lever in contact with the side surface of the fourth gear as displacement which is detected by a displacement detector to produce a motor output control signal.

In the driving unit, it may be arranged that the angular displacement detecting mechanism comprises, instead of the fourth gear engaged with the second gear with the bush internally fitted therein and loosely fitted to the serration shaft to be slidable, a fourth gear of a low frictional coefficient engaged with the second gear and loosely fitted to the shaft portion of the serration shaft to be slidable both in the rotational direction and in the axial direction. The fourth gear is provided with an internal serration formed at a part of the same inner cylinder to be engaged with the helical serration of the serration shaft.

In the driving unit, it may be arranged that the angular displacement detecting mechanism comprises a serration shaft having opposite ends rotatably supported by bearings and a cylindrical shaft portion extending between the bearings with a helical serration portion formed on the cylindrical shaft portion, a third gear of a steel material or a plastic material fixed on the serration shaft and engaged with the first gear, a fourth gear of a steel material or a plastic material engaged with the second gear with a bush internally fitted in an inner cylinder of the fourth gear so that the fourth gear is loosely fitted to the serration shaft to be slidable both in the rotational direction and in the axial direction, the fourth gear being provided with an inner serration formed in the inner cylinder with a helical angle equal to that of the helical serration portion to be engaged with the helical serration portion of the serration shaft, a ball bearing externally fitted over a stepped cylindrical shaft portion of the fourth gear, a lever including a ring-shaped plate having a fulcrum or a supporting point formed at one protruding end thereof to be kept in contact with a casing, force points including projections formed on both sides of the ring-shaped plate to be brought into contact with a side surface of an outer ring of the ball bearing, and an acting point formed on the other protruding end opposite to the fulcrum, a rotation stopper pin fixed on the casing in parallel to the serration shaft and inserted into a hole formed on the other protruding end of the lever, a compression spring urging the lever through the projections as the force points to press the ball bearing on the shaft of the fourth gear, and a displacement detector for converting a moving distance of the acting point of the lever into angular displacement to be detected. The fourth gear is angularly offset from the third gear upon occurrence of a relative angular displacement between the first and the second gears in correspondence to the magnitude of the pedaling torque so that the fourth gear is moved along the helical serration by a moving distance. The moving distance is enlarged by the lever to provide displacement of the acting point of the lever. The displacement is detected by a displacement detector to produce a motor output control signal.

In the driving unit, it may be arranged that the angular displacement detecting mechanism further comprises a bearing holder ring externally fitted over the ball bearing on the stepped cylindrical shaft portion of the fourth bearing and having a rotational direction restricted by the rotation stopper pin fixed on the casing. The projections is brought into contact with the side surface of the outer ring of the ball bearing through the bearing holder ring so that an axial moving distance of the fourth gear is enlarged by the lever.

DESCRIPTION OF THE PREFERRED EMBODIMENTS

Figure 1:
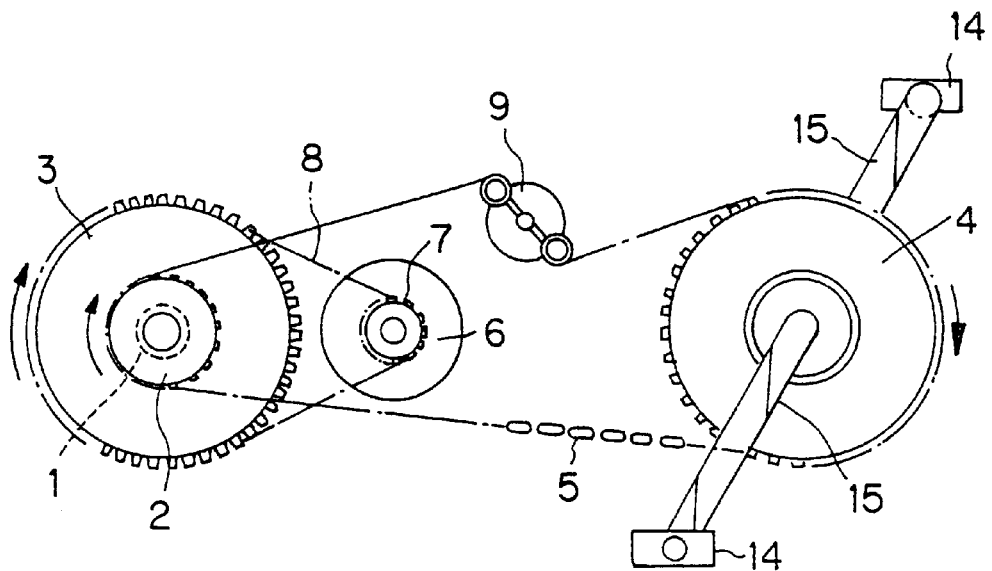
FIG. 1 is a side view of a conventional power unit for a bicycle.
Figure 2:
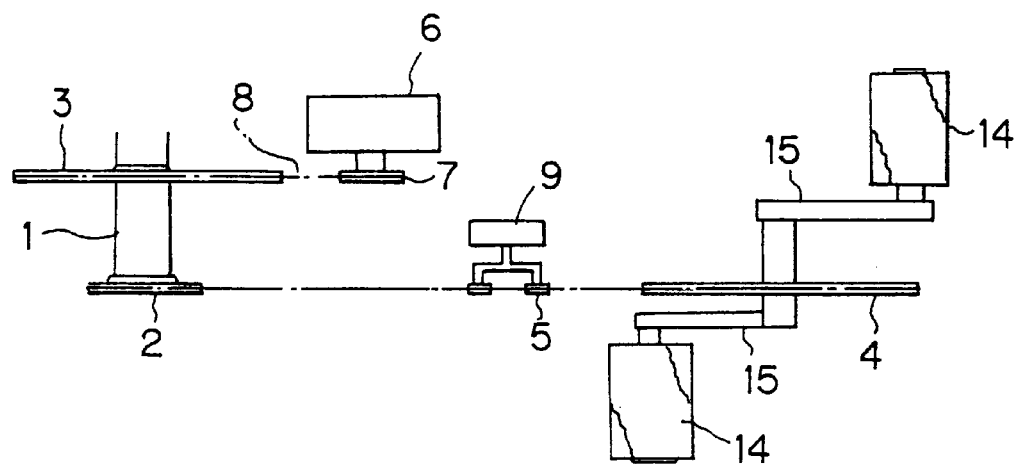
FIG. 2 is a plan view of the conventional power unit illustrated in FIG. 2.

Now, description will be made with respect to several preferred embodiments of this invention with reference to the drawing. Similar parts are designated by like reference numerals as those described in conjunction with FIGS. 1 and 2.

This invention is related to a driving unit for an electric motor driven bicycle. The driving unit serves as an auxiliary driving unit for producing auxiliary electric power to supplement human power by pedaling. The auxiliary electric power is produced by a motor energized by electric current supplied from a portable battery and added at an appropriate ratio to provide combined driving power. Thus, the human power, which is relatively small, can be supplemented by the auxiliary electric power in order to facilitate running operation of the bicycle. It will be understood that the electric motor driven bicycle can be selectively driven exclusively by pedaling, i.e., the human power.

Figure 3:
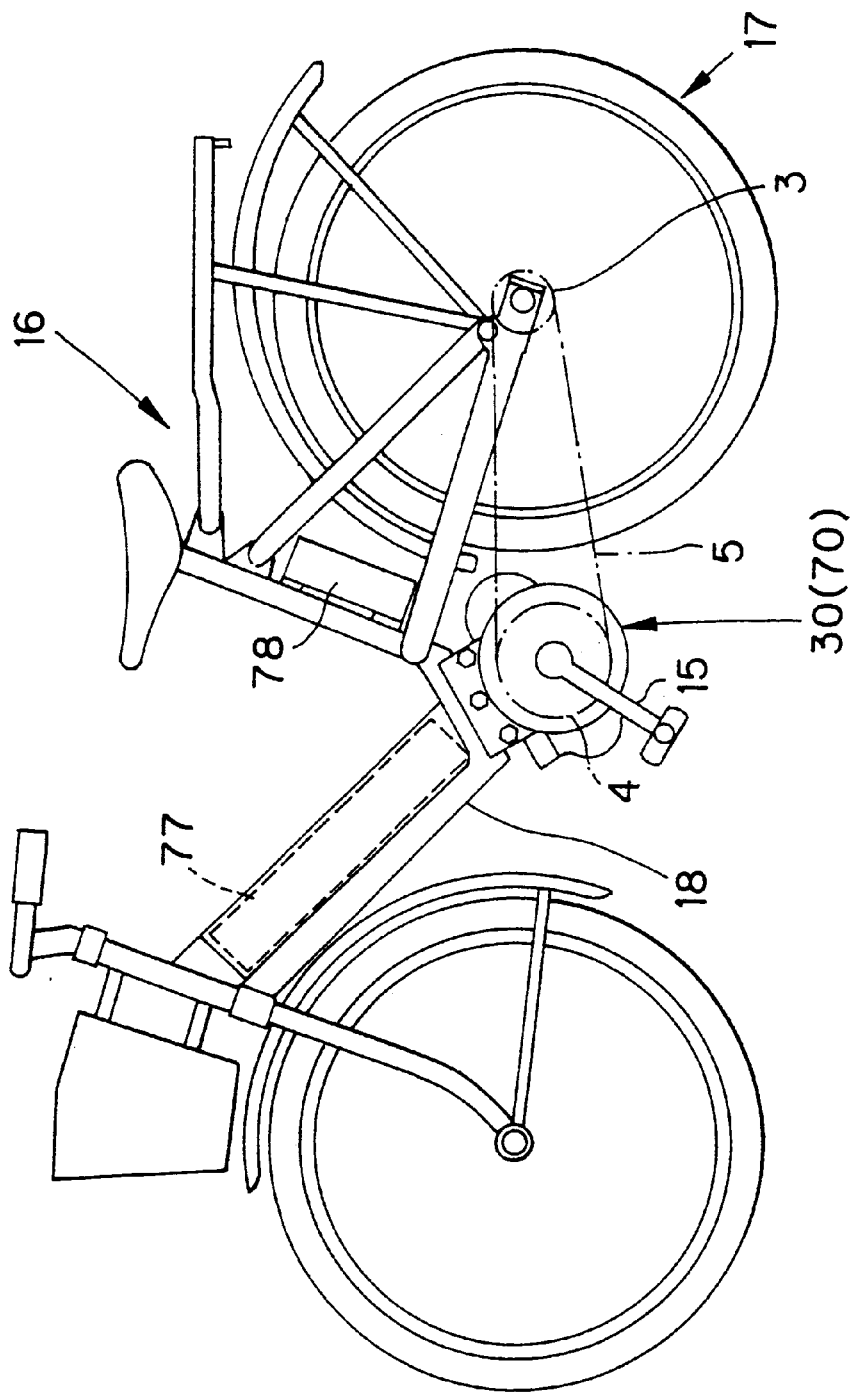
FIG. 3 is a side view of an electric motor driven bicycle to which this invention is applicable.

Referring to FIG. 3, an electric motor driven bicycle 16 has a frame 18 equipped with an auxiliary driving unit 30 according to this invention. The auxiliary driving unit 30 is disposed at a position of a crank hub. A pedal crank 15 has a pedal attached to its outmost end. A driven chain sprocket 3 is coupled through a one-way clutch to an axle of a rear wheel 17 of the bicycle 16. A chain 5 is wound around the driven chain sprocket 3 and a driving chain sprocket 4 of the driving unit 30. The chain 5 serves to transmit the human power or the rotation of the driving unit 30 to the axle of the rear wheel 17 of the bicycle 16. In the figure, the reference numerals 77 and 78 represent a chargeable battery and a controller, respectively.

First Embodiment

Referring to FIGS. 4 through 10, a driving unit 30 according to a first embodiment of this invention will be described in detail.

Figure 4:
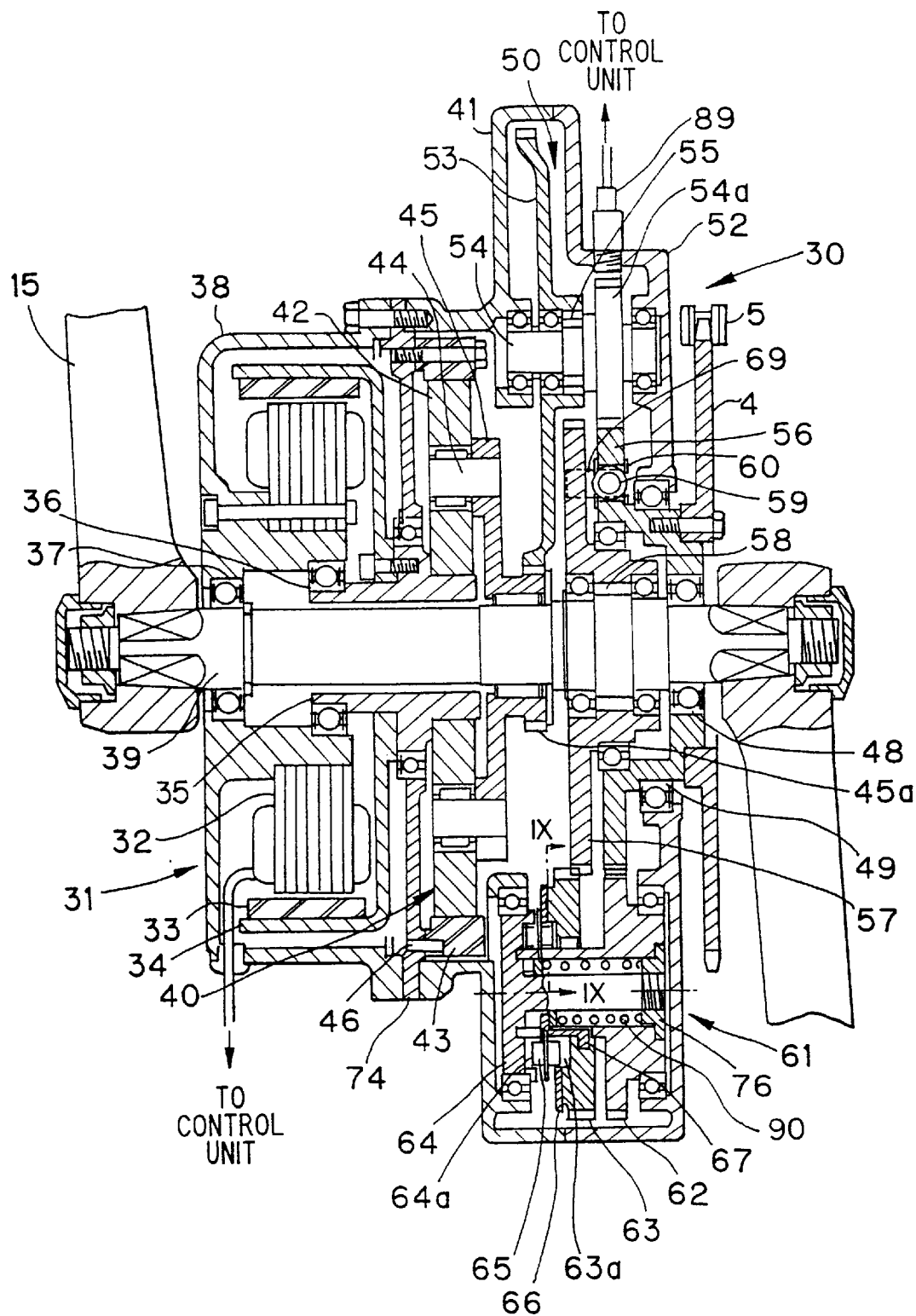
FIG. 4 is a side sectional view of a driving unit according to a first embodiment of this invention for use in the electric motor driven bicycle shown in FIG. 3.

At first referring to FIG. 4, a motor 31 is arranged in a space defined by a motor casing 38 and a partitioning wall 74. The motor 31 has a stator 32 fixedly mounted in the motor casing 38 with an exciting coil wound therearound. A rotor 34 of the motor 31 has a plurality of permanent magnets 33 attached to its inner peripheral surface at an equal interval in a circumferential direction. Thus, the motor 31 is implemented as an induction motor. The rotation speed is controllably varied by an inverter through frequency control. The torque is controllably varied by current control.

The rotor 34 is fixed to a hollow sun roller shaft 35 protruding through the partitioning wall 74 towards a speed reducer mechanism to form a sun roller. The sun roller shaft 35 has a motor-side axial end supported through a bearing 36 on the motor casing 38 and a roller-side axial end supported through a bearing on the partitioning wall 74.

A reducer casing 41 has one end integrally coupled with the motor casing 38 with the partitioning wall 74 interposed therebetween, and the other end integrally coupled with a casing cover 52. Thus, a combination of the reducer casing 41, the motor casing 38, and the casing cover 52 forms a power casing in a closed state. In the reducer casing 41, an internal roller 43 is fixed and positioned by two pins 46 to be concentric with the sun roller shaft 35. A plurality of planet rollers 42 are arranged between the sun roller shaft 35 and the internal roller 43 in contact with the outer surface of the sun roller shaft 35 and the inner surface of the internal roller 43. The planet rollers 42 are rotatably supported by a plurality of planet roller shafts 44, respectively. The planet roller shafts 44 are fixedly supported on a planet roller carrier 45 at equally spaced positions in a circumferential direction. Thus, a planet roller reducer 40 is formed.

The planet roller carrier 45 has a hollow output shaft rotatably supported by a crank shaft 39 through a bearing and has a pinion 45a formed at its axial end. The pinion 45a is engaged or meshed with a large gear 53 supported by a gear shaft 54 through a bearing and a first one-way clutch 55 so that only the power from the motor 31 is allowed to be transmitted to the gear shaft 54. The gear shaft 54 has a gear 54a integrally formed therewith and is rotatably supported through a bearing on the reducer casing 41 and the casing cover 52. The gear 54a is engaged with a final or a first gear 56 which is concentric with the crank shaft 39. Thus, a combination of the pinion 45a, the large gear 53, the gear 54a, and the first gear 56 forms a two-stage reducing gear mechanism 50.

To the first gear 56, the driving chain sprocket 4 is fixed. The first gear 56 is rotatably supported through a bearing 49 on the casing cover 52 and rotatably supports one end of the crank shaft 39 through a bearing 48. The other end of the crank shaft 39 is supported through a bearing 37 on the motor casing 38.

A second gear 57 is rotatably supported through a bearing by the crank shaft 39 and has a pitch diameter equal to that of the first gear 56. To the second gear 57, the rotation of the crank shaft 39 is transmitted through a second one-way clutch 58. The second one-way clutch 58 has a claw arranged so that the engagement occurs when the pedaling force transmitted from the pedal crank 15 to the crank shaft 39 is supplied in a forward direction.

Figure 5:
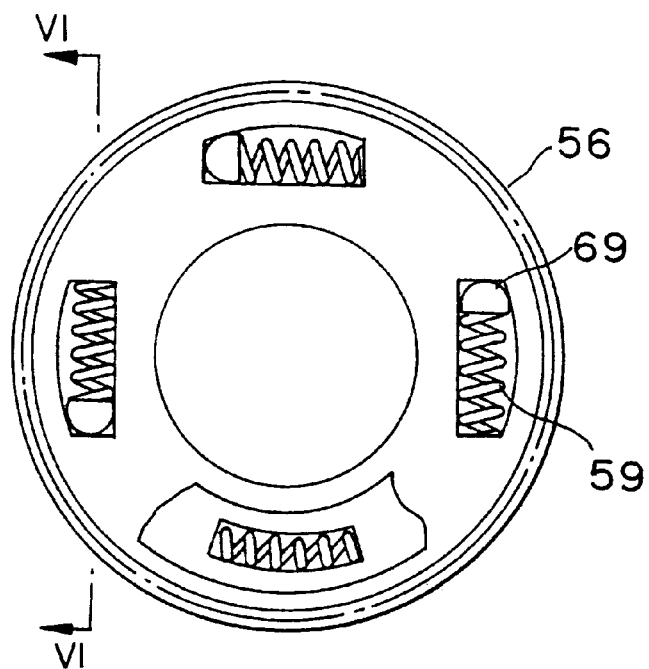
FIG. 5 shows an angular displacement mechanism illustrated in FIG. 4.
Figure 6:
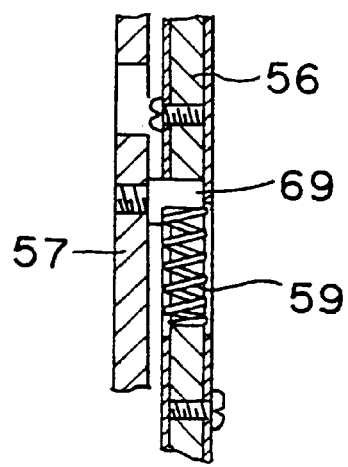
FIG. 6 is a sectional view taken along a line VI—VI in FIG. 5.
Figure 7:
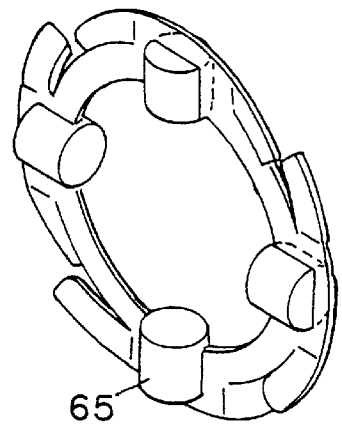
FIG. 7 is a perspective view of a roller portion of an angular displacement detecting mechanism illustrated in FIG. 4.

As illustrated in FIGS. 5 and 6, the first gear 56 is provided with a plurality of long holes penetrating therethrough from one side surface to the other and equally spaced in a circumferential direction. A plurality of compression springs 59 are received in these long holes. A plurality of protruding members 69 are attached to the second gear 57 and engaged with one ends of the compression springs 59 in a rotational direction to form an angular displacement mechanism 60 (FIG. 4). In the angular displacement mechanism 60, a pedaling torque transmitted from the second gear 57 through the protruding members 69 is received by the compression springs 59 in the first gear 56. The compression springs 59 are compressed and shortened in proportion to the pedaling torque to cause relative angular displacement between the first and the second gears 56 and 57 in correspondence to the magnitude of the pedaling torque. The pedaling torque is then transmitted through the angular displacement mechanism 60 to the driving chain sprocket 4 (FIG. 4).

The compression springs 59 in the first gear 56 of the angular displacement mechanism 60 may be applied with an initial pressure so that the relative angular displacement between the first and the second gears 56 and 57 is not caused while the pedaling torque is small. In this manner, the range of energization by the motor 31 is restricted. In this case, a control circuit is simplified.

Next referring to FIGS. 4 and 7 through 9, an angular displacement detecting mechanism 61 is for detecting the relative angular displacement between the first and the second gears 56 and 57 of the angular displacement mechanism 60. As illustrated in the figures, a gear 62 engaged with the first gear 56 and a gear 63 engaged with a gear 57 have a common pitch diameter and rotate on a common axis. The gear 62 and a support shaft 64 are integrally coupled by the use of a nut 76 and, at their opposite ends, rotatably supported through bearings on the reducer casing 41 and the casing cover 52, respectively. The gear 62 has a cylindrical portion loosely fitted to a bore portion of the gear 63. Inside the cylindrical portion of the gear 62, a compression spring 90 is received to press the gear 63 through a sliding plate 66 (or a thrust roller bearing) and a press ring 67.

Figure 9:
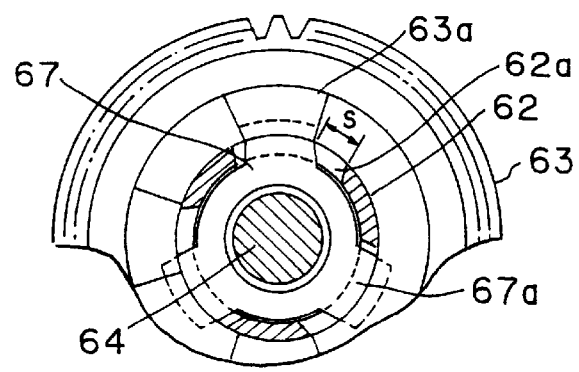
FIG. 9 is a sectional view taken along a line IX—IX in FIG. 4.

As illustrated in FIG. 9, the cylindrical portion of the gear 62 is provided with a plurality of notches 62a equiangularly spaced in a circumferential direction and extending in parallel to its rotation shaft. The press ring 67 has a plurality of protrusions 67a penetrating through the notches 62a to press the gear 63.

Upon occurrence of the relative angular displacement between the first and the second gears 56 and 57 as described above, this angular displacement is converted into relative angular displacement between the gears 62 and 63. Therefore, each notch 62a has a spare gap or margin s sufficient to allow the movement of each protrusion 67a, as illustrated in FIG. 9. On the annular side surface of the support shaft 64, a plurality of V groove cams 64a are formed at an equal interval. Likewise, on the annular side surface of the gear 63 faced thereto, a plurality of V groove cams 63a are formed. When the pedaling torque is weak so that no relative angular displacement is produced between the first and the second gears 56 and 57 of the angular displacement mechanism 60, the V groove cams 63a and 64a are exactly faced to each other. At this time, a plurality of rollers 65 are held between roots or bottoms of the V groove cams 63a and 64a.

The pressing force of the compression spring 90 has a level such that, when the rollers 65 are held between the V groove cams 63a and 64a, their positions are not shifted. Thus, branch torque is minimized when the pedaling torque is transmitted through the angular displacement detecting mechanism 61.

Figure 8:
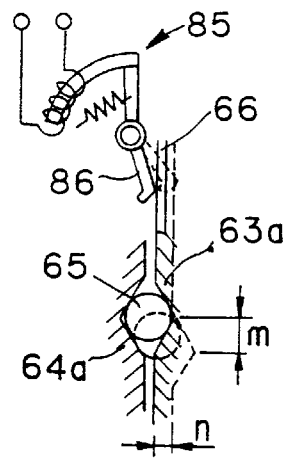
FIG. 8 shows a part of the angular displacement detecting mechanism illustrated in FIG. 4.

In the above-mentioned structure, upon occurrence of the relative angular displacement between the gears 62 and 63, the V groove cams 63a and 64a are offset from each other by a distance depicted at m in FIG. 8. In this event, the rollers 65 are forced to climb up the sloping surfaces of the V groove cams 63a and 64a. As a consequence, the gears 62 and 63 are separated from each other by a distance depicted at n in FIG. 8. The distance n is picked up by the sliding plate 66 and a lever 86 as displacement of the lever. The displacement is measured by a displacement detector (for example, a potentiometer) 85 to produce a pedaling torque signal representative of the magnitude of the pedaling torque. The pedaling torque signal is used as a function in controlling motor output.

A rotation speed sensor 89 attached to the casing cover 52 is a proximity sensor for detecting the proximity of gear teeth of the gear 54a. Specifically, the output rotation speed of the driving unit 30 of the bicycle being driven is measured by detecting the number of teeth of the gear 54a which pass through a sensing portion of the rotation speed sensor 89 per unit time.

Figure 10:
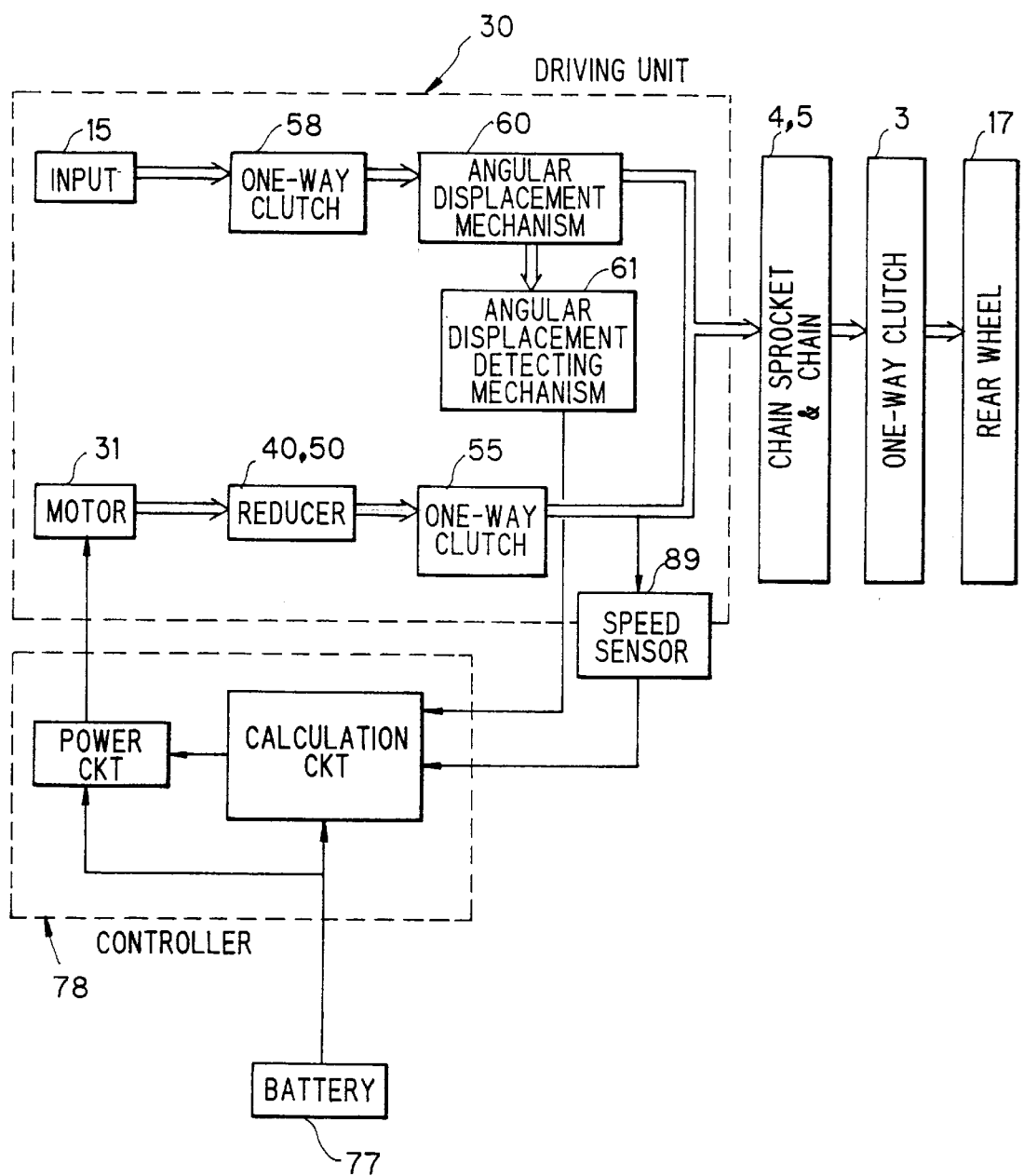
FIG. 10 is a block diagram of a power transmission and control system of the bicycle having the driving unit illustrated in FIG. 4.

Referring to FIG. 10 in addition, the operation of the driving unit 30 will be described with respect to a power transmission and control system of the bicycle to which the driving unit 30 is applied.

When the crank shaft 39 is driven by pedaling, the pedaling torque is transmitted through the one-way clutch 58 to the gear 57, passes through the angular displacement mechanism 60 comprising the gears 57 and 56, and rotates the driving chain sprocket 4. The driving chain sprocket 4 drives the chain 5 which rotates the rear wheel 17 through the one-way clutch 3 driven chain sprocket 3 formed on the rear hub. When the crank shaft 39 is stopped and the driving chain sprocket 4 is rotated in a forward direction, the clutch is disengaged or inactive resulting in an idle rotation.

When the pedaling torque is greater than a predetermined level (in case where the initial pressure is given to the compression springs 59 of the angular displacement mechanism 60 as described above), the relative angular displacement is produced between the gears 57 and 56 of the angular displacement mechanism 60 in proportion to the torque passing therethrough. The angular displacement is transmitted to the gears 62 and 63 of the angular displacement detecting mechanism 61 and converted by the V groove cams 63a and 64a and the rollers 65 into axial movement. The axial movement is picked up by the angular displacement detector 85 as an electric signal proportional to the angular displacement (pedaling torque). The electric signal is sent to the controller 78.

In the controller 78, a calculation circuit calculates the supplementing ratio (1 or less) with respect to the pedaling torque and produces a control signal to be supplied to a power circuit. In response to the control signal, the power circuit controls electric power supplied from a battery 77 to the motor 31 so that a required level of the motor output is obtained. The planet roller reducer 40 directly coupled to the output shaft of the motor 31 and the two-stage reducing gear mechanism 50 reduces the rotation to a desired rate to produce a required torque which is transmitted through the one-way clutch 55 to rotate the driving chain sprocket 4. Thus, the pedaling torque is supplemented by a driving mechanism containing the motor 31.

When the bicycle is driven by pedaling alone, the rotation is interrupted at the one-way clutch 55 and is not transmitted towards the motor 31. When the bicycle during auxiliary driving operation gains a preselected speed or more, the speed sensor 89 produces a detection signal. In response to the detection signal, the controller 78 is operated to stop the motor 31.

The above-mentioned driving unit 30 uses the planet roller reducer 40 in a high-speed section at a preceding stage. With this structure, vibration and noise can be suppressed. In addition, a combination of the motor 31 and the reducing mechanism is compact both in length and in outer diameter as a whole.

Second Embodiment

Figure 11:
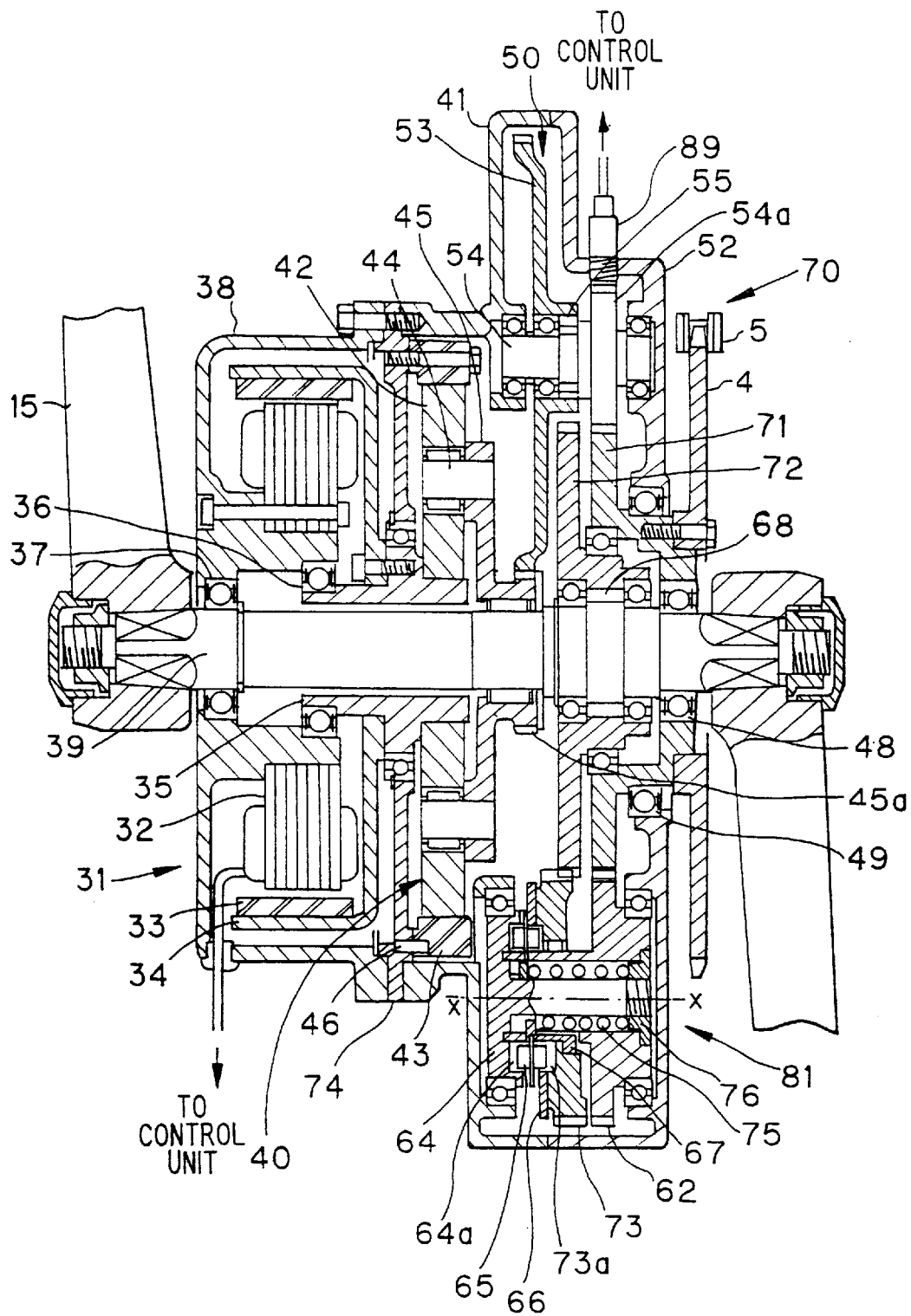
FIG. 11 is a side sectional view of a driving unit according to a second embodiment of this invention.
Figure 12:
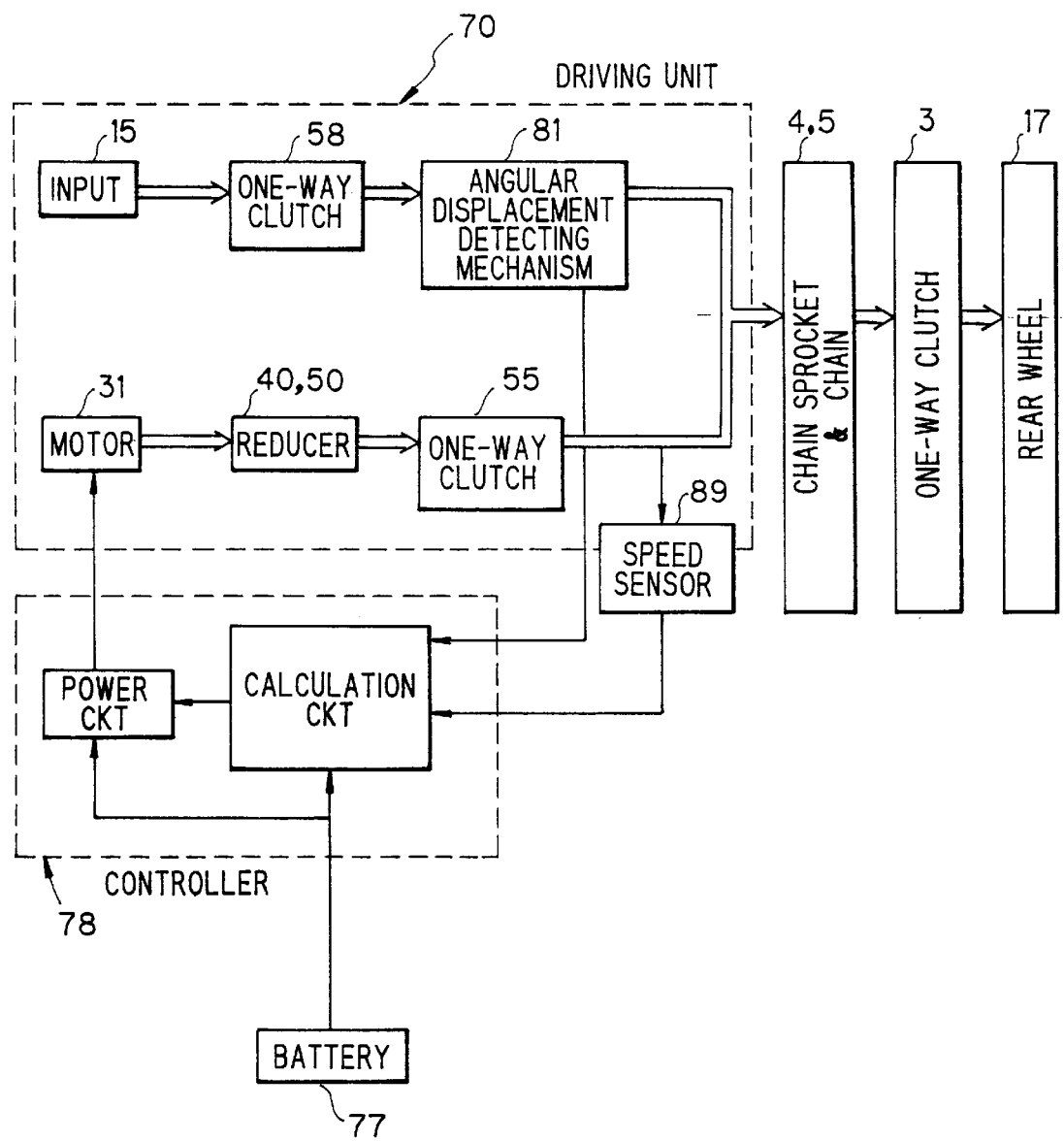
FIG. 12 is a block diagram of a power transmission and control system of the bicycle having the driving unit illustrated in FIG. 11.

Referring to FIGS. 11 and 12, a driving unit 70 according to a second embodiment of this invention is basically similar to the driving unit 30 in the first embodiment except that the angular displacement mechanism 60 and the angular displacement detecting mechanism 61 are replaced by a single angular displacement detecting mechanism 81. Similar parts are designated by like reference numerals and will not be described any longer.

As illustrated in FIG. 11, the rotation torque at the reducer side is transmitted via the one-way clutch 55 to a first gear 71 at a final stage to drive the rear wheel of the bicycle through the driving chain sprocket 4 fixed to the first gear 71 and the chain 5. The first gear 71 is also engaged with the gear 62 of the angular displacement detecting mechanism 81. The gear 62 can advantageously be manufactured by a steel material or a plastic material.

On the other hand, the pedaling torque is transmitted from the crank shaft 39 through the one-way clutch 68 to a second gear 72. The second gear 72 is engaged with a gear 73 of the angular displacement detecting mechanism 81 to transmit the rotation torque. The rotation torque transmitted to the gear 73 is transferred through a V groove cam 73*a*, the roller 65, and the V groove cam 64*a* of the angular displacement detecting mechanism 81 to the gear 62 and then to the gear 71 engaged with the gear 62 to drive the driving chain sprocket 4 and the chain 5. The gear 72 can advantageously be manufactured by a steel material or a plastic material having a low frictional coefficient.

The angular displacement detecting mechanism 81 is similar in structure to the angular displacement detecting mechanism 61 in the first embodiment except that a compression spring 75 is stronger. Specifically, in this embodiment, all of the pedaling torque passes through the angular displacement detecting mechanism 81. Therefore, the compression spring 75 must have a large spring coefficient sufficient to support the relative offset occurring between the V groove cams 73*a* and 64*a* and the roller 65 in proportion to the magnitude of the torque produced by the pedaling torque. The moving distance in the axial direction is picked up by the sliding plate 66 and the lever 86 as angular displacement which is measured by the angular displacement detector 85, as show in FIG. 8, to produce the pedaling torque signal representative of the magnitude of the pedaling torque. With reference to the pedaling torque signal, the motor output is controlled.

The compression spring 75 received in the inner cylinder of the gear 62 of the angular displacement mechanism 81 may be applied with an initial pressure so that the relative angular displacement between the gears 71 and 72 is not caused while the pedaling torque is small. In this manner, the range of energization by the motor 31 is restricted.

Referring to FIG. 12, in addition, the operation of the driving unit 70 will be described with respect to a power transmission and control system of the bicycle to which the driving unit 70 is applied.

When the crank shaft 39 is driven by pedaling, the pedaling torque is transmitted from the crank shaft 39 through the one-way clutch 68 to the gear 72. The gear 72 is engaged with the gear 73 of the angular displacement detecting mechanism 81 to transmit the rotation torque. The rotation torque transmitted to the gear 73 is transferred through the V groove cam 73*a*, the roller 65, and the V groove cam 64*a* of the angular displacement detecting mechanism 81 to the gear 62 and then to the gear 71 engaged with the gear 62 to drive the driving chain sprocket 4 and the chain 5.

When the pedaling torque is greater than a predetermined level (in case where the initial pressure is given to the compression spring 75 of the angular displacement detecting mechanism 81 as described above), the relative angular displacement is produced between the gears 73 and 62 of the angular displacement detecting mechanism 81 in proportion to the torque passing therethrough. The angular displacement is converted by the V groove cams 73*a* and 64*a* and the rollers 65 into axial movement which is picked up by the angular displacement detector 85 as an electric signal proportional to the angular displacement (pedaling torque). The electric signal is sent to the controller 78. In the controller 78, the calculation circuit calculates the supplementing ratio (1 or less) with respect to the pedaling torque and produces a control signal to be supplied to the power circuit. In response to the control signal, the power circuit controls electric power supplied from the battery 77 to the motor 31 so that a required level of the motor output is obtained. Thus, the pedaling torque is supplemented.

When the bicycle is driven by pedaling alone, the rotation is interrupted at the one-way clutch 55 and is not transmitted towards the motor 31. When the bicycle during auxiliary driving operation gains a preselected speed or more, the speed sensor 89 produces a detection signal. In response to the detection signal, the controller 78 is operated to stop the motor 31.

Third Embodiment

Figure 13:
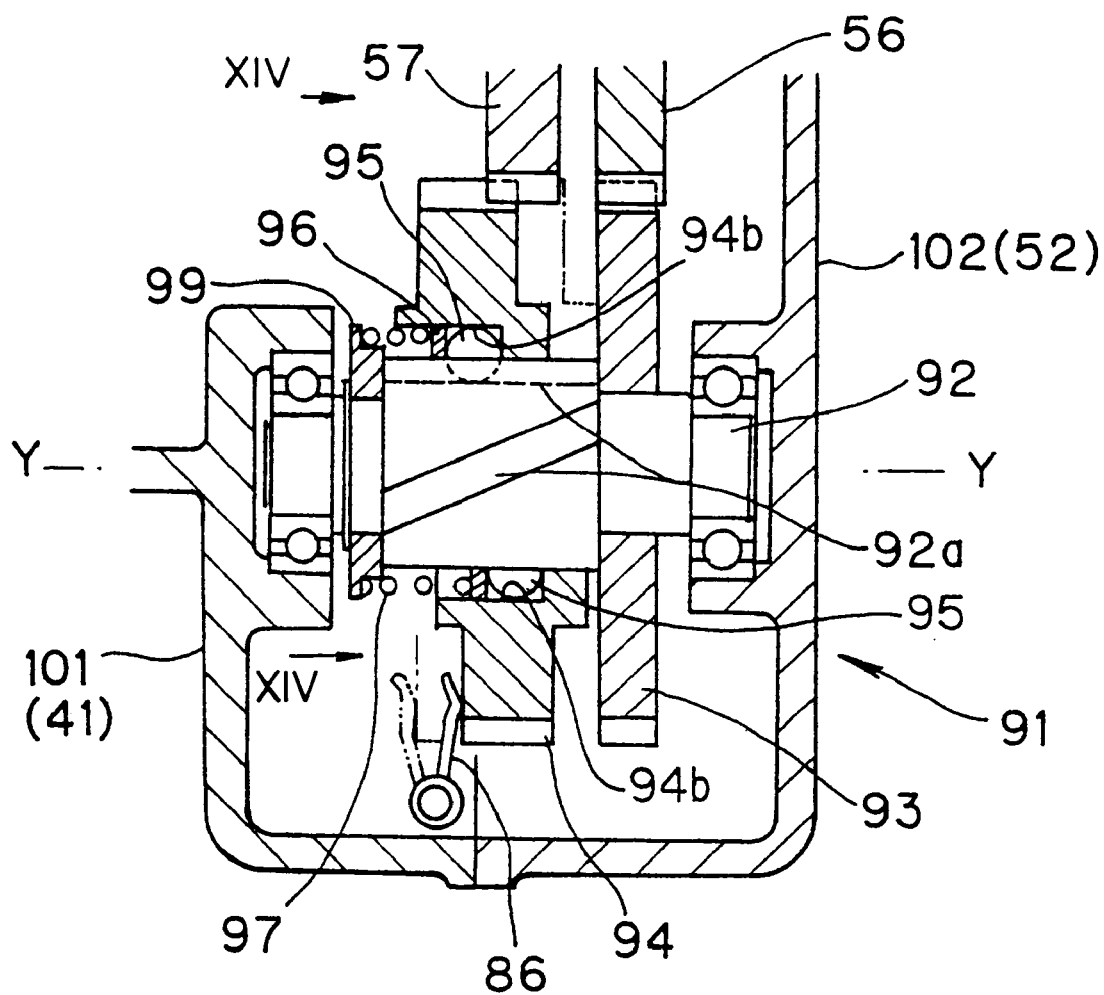
FIG. 13 is a sectional view of a part of an angular displacement detecting mechanism of a driving unit according to a third embodiment of this invention.
Figure 14:
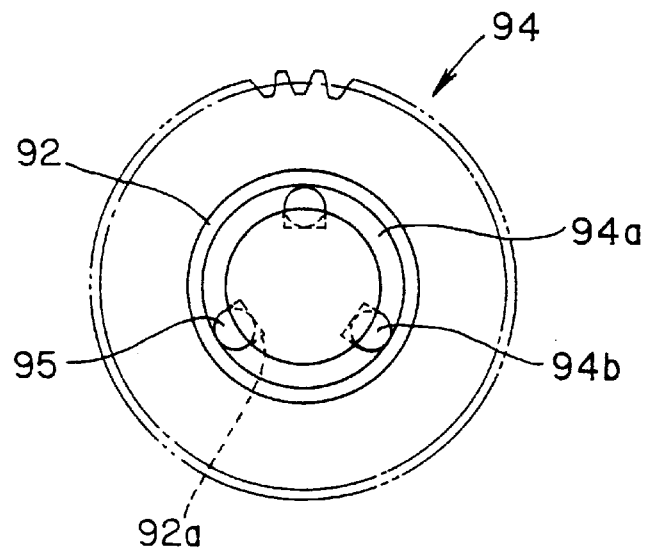
FIG. 14 is a sectional view taken along a line XIV—XIV in FIG. 13.
Figure 15:
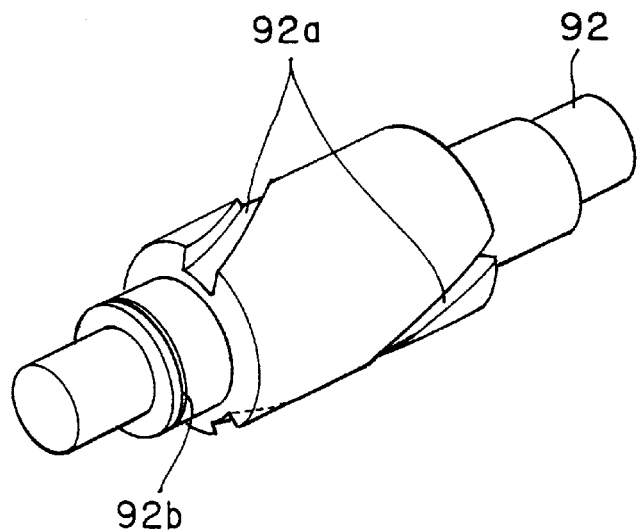
FIG. 15 is a perspective view of a helical groove shaft 92 illustrated in FIG. 13.

Referring to FIGS. 13 through 15, a driving unit according to a third embodiment of this invention is similar to that described in conjunction with the first embodiment except that the angular displacement detecting mechanism 61 for detecting the relative angular displacement between the gears 56 and 57 of the angular displacement mechanism 60 is replaced by an angular displacement detecting mechanism 91 simplified in structure. Similar parts are designated by like reference numerals and will not be described.

As illustrated in FIGS. 13–15, a gear 93 engaged with the gear 56 and a gear 94 engaged with the gear 57 have a common pitch diameter. The gear 93 is integrally coupled to a helical groove shaft 92 by press-fit or bonding. The gear 94 is rotatably and slidably supported by the helical groove shaft 92. The helical groove shaft 92 has both ends rotatably supported through bearings on a reducer casing 101 and a casing cover 102. As shown in FIG. 13, the reducer casing 101 and the casing cover 102 are different in configuration from the reducer casing 41 and the casing cover 52 in the first embodiment. The helical groove shaft 92 is provided with a plurality of helical grooves 92a having a width equal to the diameter of each of balls 95 (FIG. 15) and formed at an equiangular interval. The gear 94 is loosely fitted to the helical groove shaft 92 and provided with a stepped portion 94a formed at its bore side. In the interior of the stepped portion 94a, a plurality of semispherical grooves 94b, equal in number to the helical grooves 92a, are formed at an equiangular interval in parallel to the axial lines of the helical grooves 92a. Each groove 94b has a depth equal to the diameter of each ball 95 so as to allow insertion of a half of each ball 95. The balls 95, equal in number to the grooves 94b are simultaneously engaged with the grooves 94b and the helical grooves 92a. The helical groove shaft 92 has a spring holder 99 and an annular plate 96 with a compression spring 97 interposed therebetween in an urged state. The compression spring 97 serves to prevent the balls 95 from escaping from the grooves 94b. The pressing force of the compression spring 97 causes, through the helical grooves 92a, the pressing force onto the gear 94 in the rotational direction. As a consequence, the backlash between the gears 94 and 57 in one direction can be avoided. Simultaneously, the backlash between the gears 56 and 93 is avoided. It is thus possible to improve angular accuracy in transmission of rotation between the gears. Advantageously, the gear 93 can be manufactured from a steel material or a plastic material and the gear 94 can be manufactured from a steel material or a plastic material having a low frictional coefficient. In FIG. 15, a reference numeral 92b represents a snap ring.

As described in conjunction with the first embodiment, upon occurrence of the relative angular displacement between the gears 56 and 57, the angular displacement is transformed into the relative angular displacement between the gears 93 and 94. The gear 94 is moved through the balls 95 along the helical grooves 92a in the axial direction. In FIG. 13, a lower part below the center line Y—Y of the helical groove shaft 92 shows the position where the gear 94 approaches the gear 93 because the pedaling torque is not transmitted to the angular displacement mechanism 60 (FIG. 4). On the other hand, an upper part in the figure shows the position where the gear 94 is apart from the gear 93 because the pedaling torque is transmitted. The moving distance is picked up by the lever 86 as displacement which is measured by a displacement detector (not shown) such as the angular displacement detector 85 (FIG. 8) in the first embodiment. The displacement detector produces a pedaling torque signal representative of the magnitude of the pedaling torque. The pedaling torque signal is used as a function in controlling motor output.

Fourth Embodiment

Figure 16:
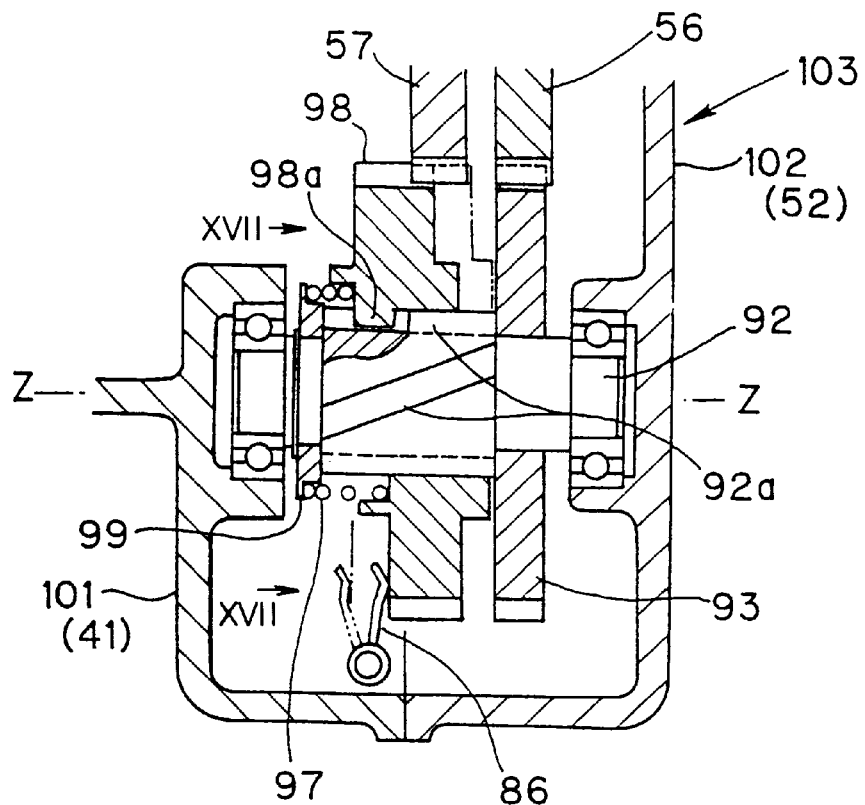
FIG. 16 is a sectional view of a part of an angular displacement detecting mechanism of a driving unit according to a fourth embodiment of this invention.
Figure 17:
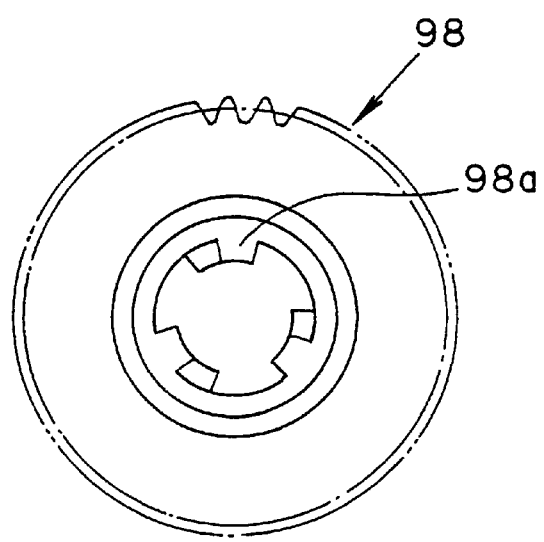
FIG. 17 is a sectional view taken along a line XVII—XVII in FIG. 16.

Referring to FIGS. 16, 17, and FIG. 15, in addition, a driving unit according to a fourth embodiment of this invention is similar to that described in conjunction with the first embodiment except that the angular displacement detecting mechanism 61 for detecting the relative angular displacement between the gears 56 and 57 of the angular displacement mechanism 60 is replaced by an angular displacement detecting mechanism 103 which has a simplified structure. Similar parts are designated by like reference numerals and will not be described. Some of the components in this embodiment are similar to those described in conjunction with the third embodiment and therefore designated by like reference numerals.

As illustrated in these figures, the gear 93 engaged with the gear 56 and a gear 98 engaged with the gear 57 have a common pitch diameter. The gear 93 comprises a steel material or a plastic material and is integrally coupled to the helical groove shaft 92 by press-fit or bonding. The gear 98 comprises a steel material or a plastic material having a low frictional coefficient and is rotatably and slidably supported by the helical groove shaft 92. The helical groove shaft 92 has both ends rotatably supported through bearings on the reducer casing 101 and the casing cover 102. The helical groove shaft 92 is provided with a plurality of the helical grooves 92a having a predetermined width and formed at an equiangular interval (FIG. 15). On the bore side of the gear 98, a plurality of protruding portions 98a equal in number to the helical grooves 92a are formed at an equiangular interval to be engaged with the helical grooves 92a.

The pressing force of the compression spring 97 interposed between the gear 98 and the spring holder 99 attached to the helical groove shaft 92 causes, through the helical grooves 92a, the pressing force onto the gear 98 in the rotational direction. As a consequence, the backlash between the gears 98 and 57 in one direction can be avoided. Simultaneously, the backlash between the gears 56 and 93 is avoided. It is thus possible to improve angular accuracy in transmission of rotation between the gears. By minimizing the pressing force of the compression spring 97 and allowing only a very small torque to be transmitted to the gears 93 and 98, a sufficient durability is achieved even if the gears comprise a plastic material.

As described in conjunction with the first embodiment, upon occurrence of the relative angular displacement between the gears 56 and 57, the angular displacement is transformed into the relative angular displacement between the gears 93 and 98. The gear 98 is moved along the helical grooves 92a in the axial direction. In FIG. 16, a lower part below the center line Z—Z of the helical groove shaft 92 shows the position where the gear 98 approaches the gear 93 because the pedaling torque is not transmitted to the angular displacement mechanism 60 (FIG. 4). On the other hand, an upper part in the figure shows the position where the gear 98 is apart from the gear 93 because the pedaling torque is transmitted. The moving distance is picked up by the lever 86 as a displacement which is measured by a displacement detector (not shown) such as the angular displacement detector 85 (FIG. 8) in the first embodiment. The displacement detector produces a pedaling torque signal representative of the pedaling torque. The pedaling torque signal is used as a function in controlling motor output.

Fifth Embodiment

Figure 18:
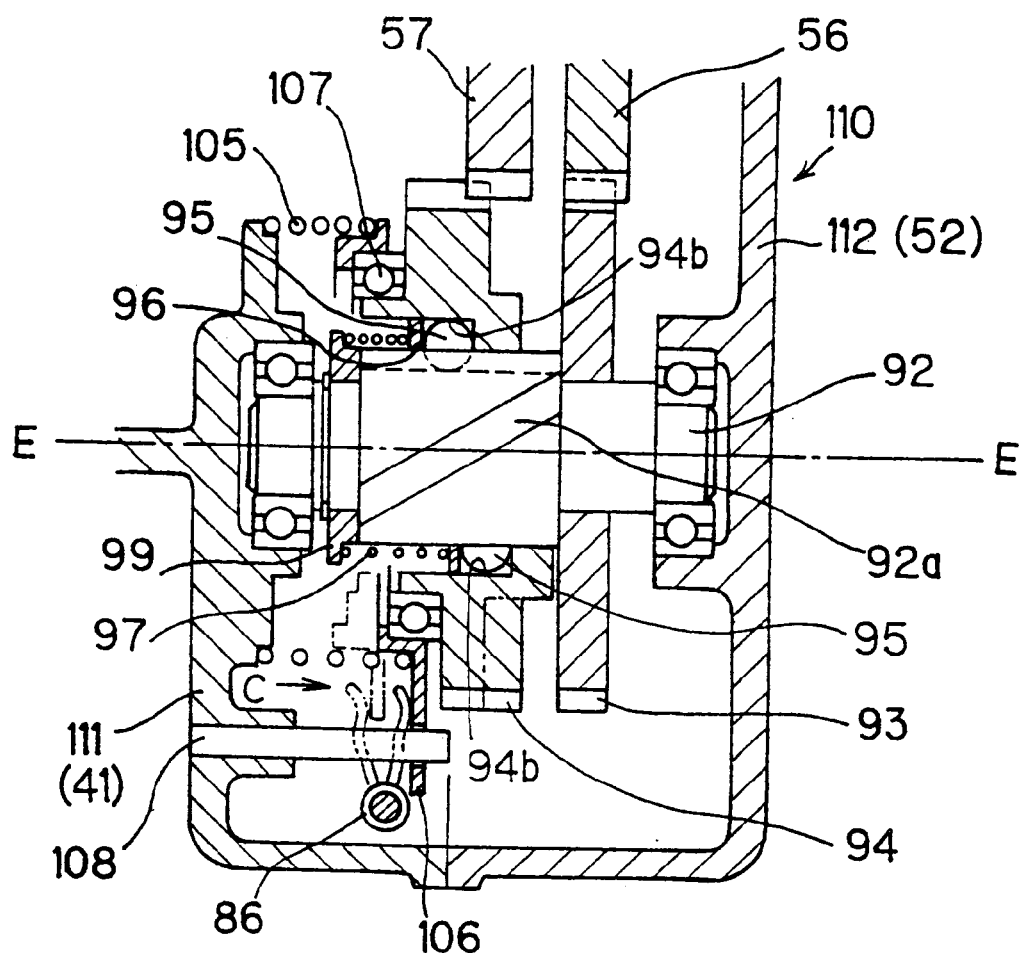
FIG. 18 is a sectional view of a part of an angular displacement detecting mechanism of a driving unit according to a fifth embodiment of this invention.

Referring to FIGS. 18 and 15, a driving unit according to a fifth embodiment of this invention is similar to that described in conjunction with the first embodiment except that the angular displacement detecting mechanism 61 for detecting the relative angular displacement between the gears 56 and 57 of the angular displacement mechanism 60 is replaced by an angular displacement detecting mechanism 110 which has a simplified structure. Similar parts are designated by like reference numerals and will not be described. Some of the components in this embodiment are similar to those described in conjunction with the third embodiment and therefore designated by like reference numerals. The configuration of the fourth gear 94 as seen from a direction C is similar to that illustrated in FIG. 14 and further illustration is omitted herein.

As illustrated in FIGS. 18 and 15, the gear 93 engaged with the gear 56 and the gear 94 engaged with the gear 57 have a common pitch diameter. The gear 93 is integrally coupled to the helical groove shaft 92 by press-fit or bonding. The gear 94 is rotatably and slidably supported by the helical groove shaft 92. The helical groove shaft 92 has both ends rotatably supported through bearings on a reducer casing 111 and a casing cover 112. As shown in FIG. 18, the reducer casing 111 and the casing cover 112 are different in configuration from the reducer casing 41 and the casing cover 52 in the first embodiment. As illustrated in FIG. 15, the helical groove shaft 92 is provided with a plurality of helical grooves 92a having a width equal to the diameter of each of the balls 95 and formed at an equiangular interval. The gear 94 is loosely fitted to the helical groove shaft 92 and provided with the stepped portion 94a (FIG. 14) formed at its bore side. In the interior of the stepped portion 94a, a plurality of the semispherical grooves 94b, equal in number to the helical grooves 92a, are formed at an equiangular interval in parallel to the axial lines of the helical grooves 92a. Each groove 94b has a depth equal to the diameter of each ball 95 so as to allow insertion of a half of each ball 95. The balls 95, equal in number to the grooves 94b are simultaneously engaged with the grooves 94b and the helical grooves 92a. Between the spring holder 99 and the annular plate 96 attached to the helical groove shaft 92, the compression spring 97 is interposed in an urged state. The compression spring 97 serves to prevent the balls 95 from escaping from the grooves 94b.

The gear 94 has a stepped axial cylindrical portion to which a ball bearing 107 is fitted. The outer peripheral surface of the ball bearing 107 is fitted to a bearing holder ring 106. Between the bearing holder ring 106 and the casing 111, a compression spring 105 is arranged and urged in a direction of pressing the gear 94 towards the gear 93. The casing 111 is provided with a rotation stopper shaft 108 in parallel to the helical groove shaft 92. The rotation stopper shaft 108 is engaged with a hole formed in an outer periphery of the bearing holder ring 106 and serves to allow the movement of the bearing holder ring 106 in the axial direction of the helical groove shaft 92 but to restrict the movement in the rotational direction.

The pressing force of the compression springs 97 and 105 causes, through the helical grooves 92a, the pressing force onto the gear 94 in the rotational direction. As a consequence, the backlash between the gears 94 and 57 in one direction can be avoided. Simultaneously, the backlash between the gears 56 and 93 is avoided. It is thus possible to improve angular accuracy in transmission of rotation between the gears.

As described in conjunction with the first embodiment, upon occurrence of the relative angular displacement between the gears 56 and 57, the angular displacement is transformed into the relative angular displacement between the gears 93 and 94. The gear 94 is moved through the balls 95 along the helical grooves 92a in the axial direction. In FIG. 18, a lower part below the center line E—E of the helical groove shaft 92 shows the position where the gear 94 approaches the gear 93 because the pedaling torque is not transmitted to the angular displacement mechanism 60 (FIG. 4). On the other hand, an upper part in the figure shows the position where the gear 94 is apart from the gear 93 because the pedaling torque is transmitted. The moving distance is picked up by the lever 86 as a displacement which is measured by a displacement detector (not shown) such as the potentiometer 85 (FIG. 8) in the first embodiment. The displacement detector produces a pedaling torque signal representative of the magnitude of the pedaling torque. The pedaling torque signal is used as a function in controlling motor output.

In this embodiment, when the displacement of the gear 94 is picked up upon detection of the torque, a portion subjected to a pressing force of the torque detecting lever 86 is not rotated. Thus, no relative sliding is caused so that the possibility of wear is removed without any specific anti-wear treatment at contacting portions of the lever 86 and the gear 94. This improves the durability and the accuracy in torque detection.

Sixth Embodiment

Figure 19:
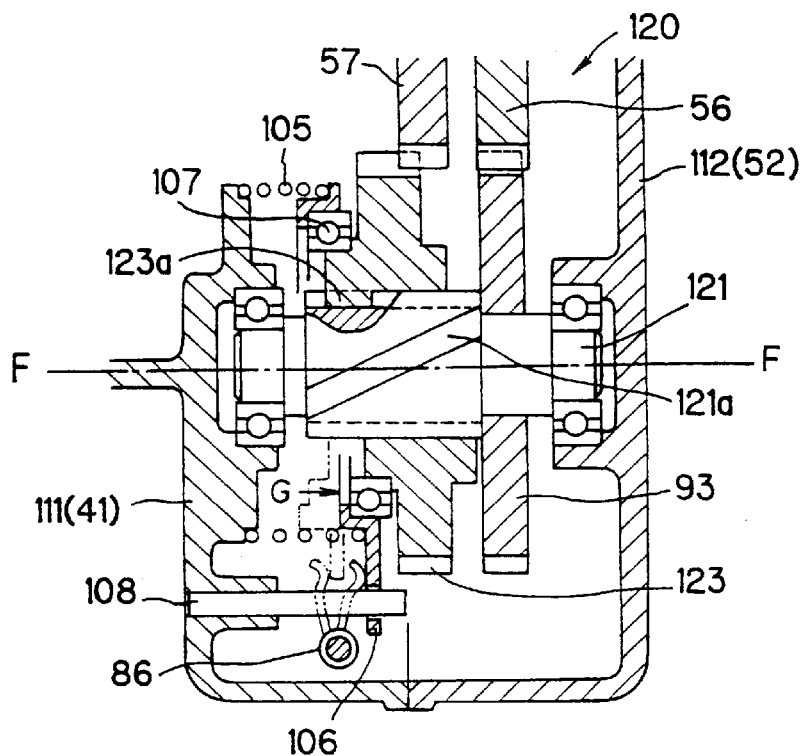
FIG. 19 is a sectional view of a part of an angular displacement detecting mechanism of a driving unit according to a sixth embodiment of this invention.
Figure 20:
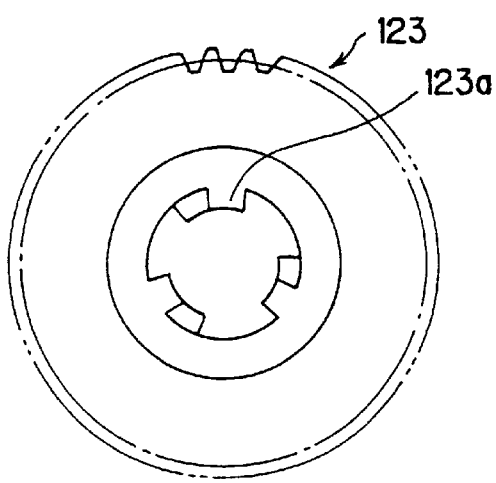
FIG. 20 is a front view of a fourth gear as seen from a direction depicted at G in FIG. 19.

Referring to FIGS. 19, 20, and 15, a driving unit according to a sixth embodiment of this invention is similar to that described in conjunction with the first embodiment except that the angular displacement detecting mechanism 61 for detecting the relative angular displacement between the gears 56 and 57 of the angular displacement mechanism 60 is replaced by an angular displacement detecting mechanism 120 which has a simplified structure. Similar parts are designated by like reference numerals and will not be described. Some of the components in this embodiment are similar to those described in conjunction with the fourth embodiment and therefore designated by like reference numerals.

As illustrated in FIGS. 19, 20, and 15 these figures, the gear 93 engaged with the gear 56 and a gear 123 (corresponding to the gear 94 in other embodiments) engaged with the gear 57 have a common pitch diameter. The gear 93 comprises a steel material or a plastic material and is integrally coupled to a helical groove shaft 121 (corresponding to the helical groove shaft 92 in other embodiments) by press-fit or bonding. The gear 123 comprises a plastic material having a low frictional coefficient and is rotatably and slidably supported on the helical groove shaft 121. The helical groove shaft 121 has opposite ends rotatably supported through bearings on the reducer casing 111 and the casing cover 112 (corresponding to the casing 41 and the casing cover 52 in the first embodiment, respectively). The helical groove shaft 121 is provided with a plurality of helical grooves 121a having a predetermined width and formed at an equiangular interval (FIG. 15). The helical groove shaft 121 is similar in configuration to the helical groove shaft 92 in FIG. 15 except that the snap ring groove 92b is omitted. As illustrated in FIG. 20, a plurality of protruding portions 123a equal in number to the helical grooves 92a are formed on the bore side of the gear 123 at an equiangular interval to be engaged with the helical grooves 121a.

The gear 123 has a stepped axial cylindrical portion to which the ball bearing 107 is fitted. The outer peripheral surface of the ball bearing 107 is fitted to the bearing holder ring 106. Between the bearing holder ring 106 and the casing 111, the compression spring 105 is arranged and urged in a direction of pressing the gear 123 towards the gear 93. The casing 111 is provided with the rotation stopper shaft 108 in parallel to the helical groove shaft 121. The rotation stopper shaft 108 is engaged with the hole formed in the outer periphery of the bearing holder ring 106 and serves to allow the movement of the bearing holder ring 106 in the axial direction of the helical groove shaft 121 but to restrict the movement in the rotational direction.

The pressing force of the compression spring 105 causes, through the helical grooves 121a, the pressing force onto the gear 123 in the rotational direction. As a consequence, the backlash between the gears 123 and 57 in one direction can be avoided. Simultaneously, the backlash between the gears 56 and 93 is avoided. It is thus possible to improve angular accuracy in transmission of rotation between the gears. By minimizing the pressing force of the compression spring 105 and allowing only a very small torque to be transmitted to the gears 93 and 123, a sufficient durability is achieved even if the gears comprise a plastic material.

As described in conjunction with the first embodiment, upon occurrence of the relative angular displacement between the gears 56 and 57, the angular displacement is transformed into the relative angular displacement between the gears 93 and 123. The gear 123 is moved along the helical grooves 121a in the axial direction. In FIG. 19, a lower part below the center line F—F of the helical groove shaft 121 shows the position where the gear 123 approaches the gear 93 because the pedaling torque is not transmitted to the angular displacement mechanism 60 (FIG. 4). On the other hand, an upper part in the figure shows the position where the gear 123 is apart from the gear 93 because the pedaling torque is transmitted. The moving distance is picked up by the lever 86 as displacement which is measured by a displacement detector (not shown) such as the potentiometer 85 (FIG. 8) in the first embodiment. The displacement detector produces a pedaling torque signal representative of the magnitude of the pedaling torque. The pedaling torque signal is used as a function in controlling motor output.

In this embodiment also, when the displacement of the gear 123 is picked up upon detection of the torque, the portion subjected to the pressing force of the torque detecting lever 86 is not rotated. Thus, no relative sliding is caused so that the possibility of wear is removed without any specific anti-wear treatment at contacting portions of the lever 86 and the gear 123. This improves the durability and the accuracy in torque detection.

Seventh Embodiment

Figure 21:
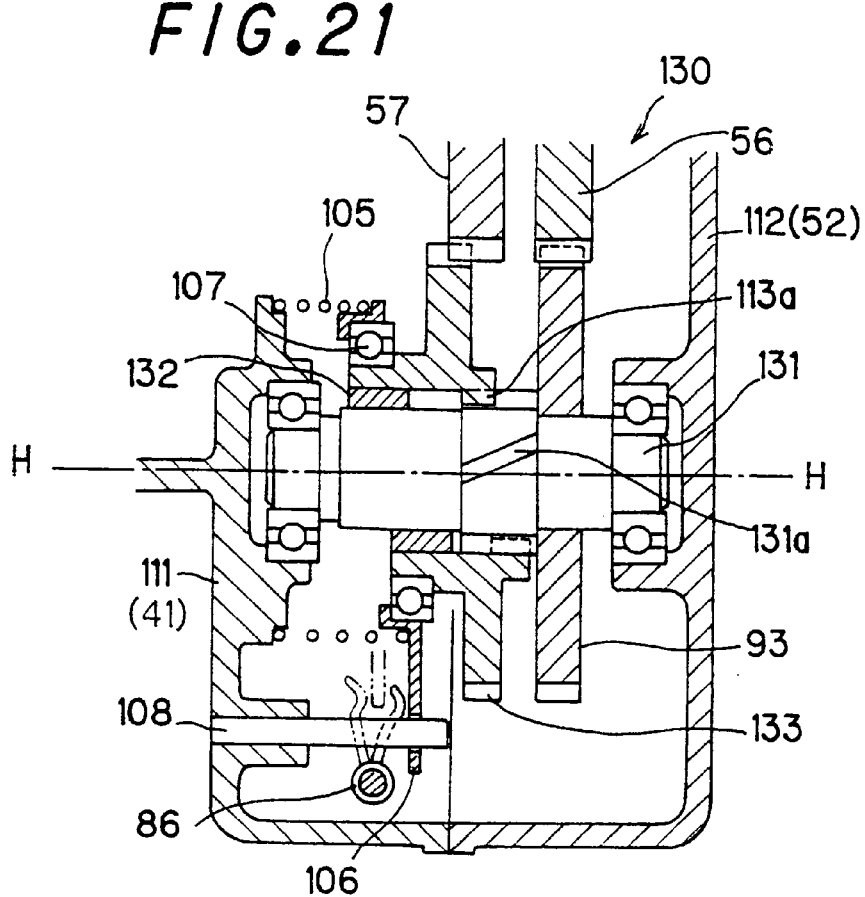
FIG. 21 is a sectional view of a part of an angular displacement detecting mechanism of a driving unit according to a seventh embodiment of this invention.
Figure 22:
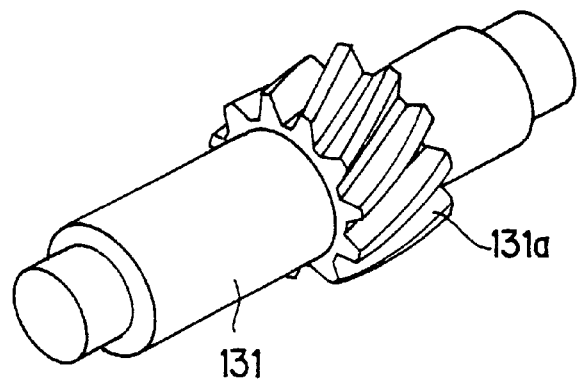
FIG. 22 is a perspective view of a serration shaft illustrated in FIG. 21.

Referring to FIGS. 21 and 22, a driving unit according to a seventh embodiment of this invention is similar to that described in conjunction with the first embodiment except that the angular displacement detecting mechanism 61 for detecting the relative angular displacement between the gears 56 and 57 of the angular displacement mechanism 60 is replaced by an angular displacement detecting mechanism 130 which has a simplified structure. Similar parts are designated by like reference numerals and will not be described. Some of the components in this embodiment are similar to those described in conjunction with the fourth and the sixth embodiments and therefore designated by like reference numerals.

As illustrated in FIG. 21, the gear 93 engaged with the gear 56 and a gear 133 (corresponding to the gear 94 or 123 in other embodiments) engaged with the gear 57 have a common pitch diameter. The gear 93 comprises a steel material or a plastic material and is integrally coupled to a serration shaft 131 (corresponding to the helical groove shaft 92 or 121 in other embodiments) by press-fit or bonding. The gear 133 comprises a steel material (or a plastic material having a low frictional coefficient) and is rotatably and slidably supported by the serration shaft 131. The serration shaft 131 has opposite ends rotatably supported through bearings on the reducer casing 111 and the casing cover 112 (corresponding to the casing 41 and the casing cover 52 in the first embodiment, respectively). As illustrated in FIG. 22, the serration shaft 131 is provided with a helical serration having an appropriate angle with respect to the axial line. On the bore side of the gear 133, an inner helical serration 133a is formed at a part of the cylindrical bore to be engaged with a helical serration 131a. In addition, a bush 132 having good lubricity (for example, porous sintered alloy) is press-fitted into the cylindrical bore of the gear 133.

The gear 133 has a cylindrical shaft portion to which the ball bearing 107 is fitted. The outer peripheral surface of the ball bearing 107 is fitted to the bearing holder ring 106. Between the bearing holder ring 106 and the casing 111, the compression spring 105 is arranged and urged in a direction of pressing the gear 133 towards the gear 93. The casing 111 is provided with the rotation stopper shaft 108 in parallel to the serration shaft 131. The rotation stopper shaft 108 is engaged with the hole formed in the outer periphery of the bearing holder ring 106 and serves to allow the movement of the bearing holder ring 106 in the axial direction of the serration shaft 131 but to restrict the movement in the rotational direction.

The pressing force of the compression spring 105 causes, through the helical serration 131a and the inner helical serration 133a, the pressing force onto the gear 133 in the rotational direction. As a consequence, the backlash between the gears 133 and 57 in one direction can be avoided. Simultaneously, the backlash between the gears 56 and 93 is avoided. It is thus possible to improve angular accuracy in transmission of rotation between the gears.

As described in conjunction with the first embodiment, upon occurrence of the relative angular displacement between the gears 56 and 57, the angular displacement is transformed into the relative angular displacement between the gears 93 and 133. The gear 133 is moved along the helical serration 131a in the axial direction. In FIG. 21, a lower part below the center line H—H of the serration shaft 131 shows the position where the gear 133 approaches the gear 93 because the pedaling torque is not transmitted to the angular displacement mechanism 60 (FIG. 4). On the other hand, an upper part in the figure shows the position where the gear 133 is apart from the gear 93 because the pedaling torque is transmitted. The moving distance is picked up by the lever 86 as displacement which is measured by a displacement detector (not shown) such as the potentiometer 85 (FIG. 8) in the first embodiment. The displacement detector produces a pedaling torque signal representative of the magnitude of the pedaling torque. The pedaling torque signal is used as a function in controlling motor output.

The gear 133 may be a molded product of a plastic material having a low frictional coefficient. In this case, the bush 132 is not required. Instead, a portion corresponding to the bush 132 is formed as an integral part of the gear. By minimizing the pressing force of the compression spring 105 and allowing only a very small torque to be transmitted to the gears 93 and 133, a sufficient durability is achieved even if the gears comprise a plastic material.

In this embodiment also, when the displacement of the gear 133 is picked up upon detection of the torque, the portion subjected to the pressing force of the torque detecting lever 86 is not rotated. Thus, no relative sliding is caused so that the possibility of wear is removed without any specific anti-wear treatment at contacting portions of the lever 86 and the gear 133. This improves the durability and the accuracy in torque detection. On the serration shaft 131, the gear 133 is reliably supported by the bush 132 so that the durability is improved in the inner helical serration 133a of the gear 133 and the bearing portion (bush 132, or a plastic bearing having a low frictional coefficient). Thus, offset rotation of the gear 133 is prevented to maintain the accuracy in torque detection.

Eighth Embodiment

Figure 23:
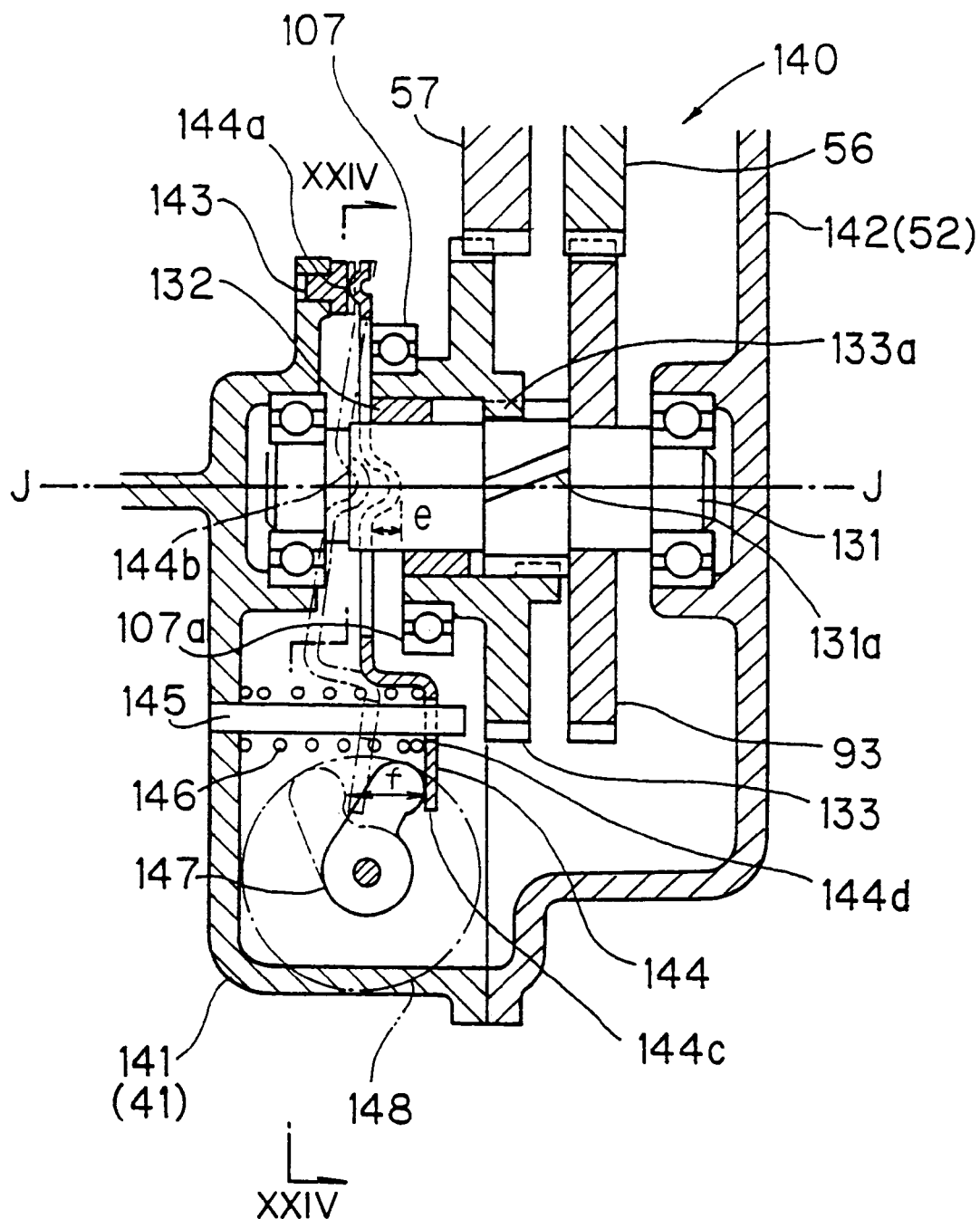
FIG. 23 is a sectional view of a part of an angular displacement detecting mechanism of a driving unit according to an eighth embodiment of this invention.
Figure 24:
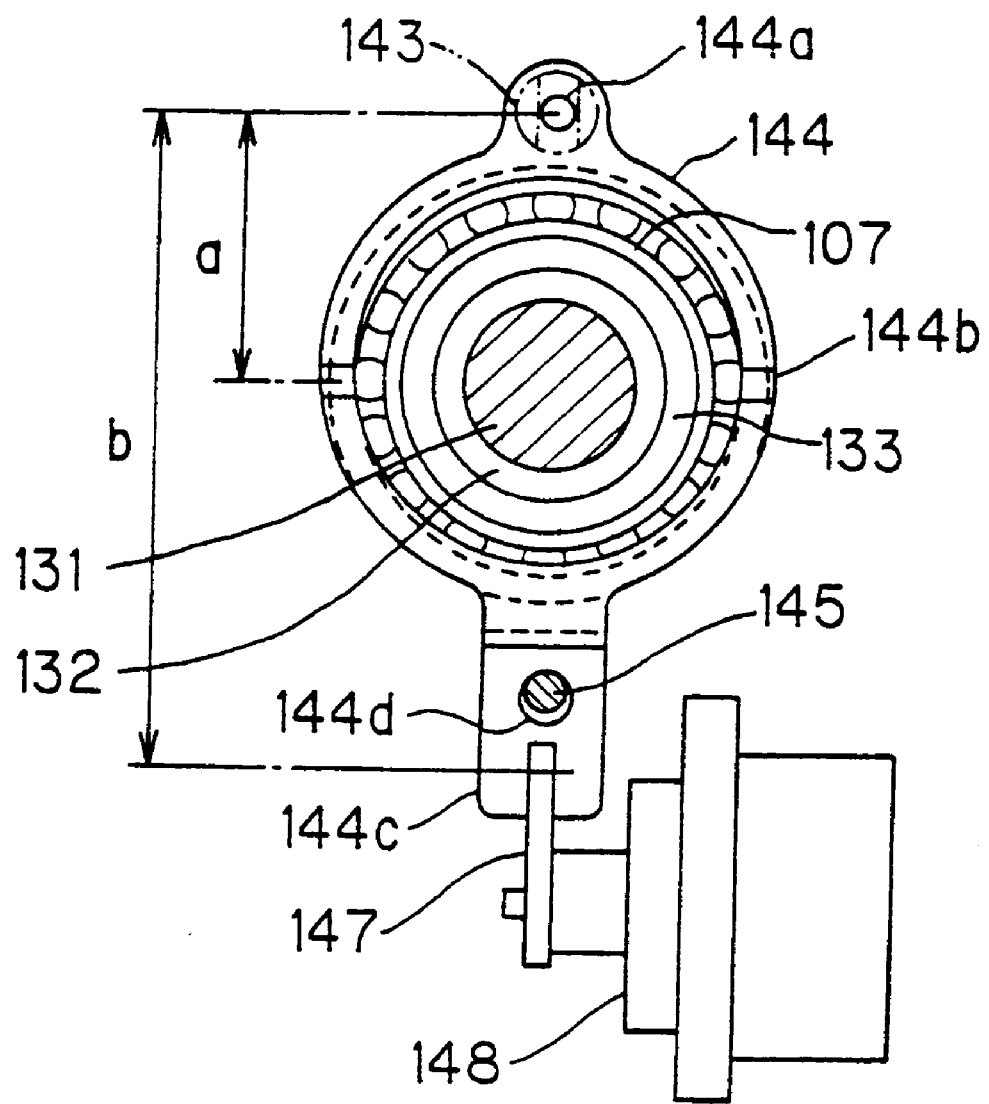
FIG. 24 is a sectional view of a lever taken along a line XXIV—XXIV in FIG. 23.

Referring to FIGS. 23 and 24, a driving unit according to an eighth embodiment of this invention is similar to that described in conjunction with the first embodiment except that the angular displacement detecting mechanism 61 for detecting the relative angular displacement between the gears 56 and 57 of the angular displacement mechanism 60 is replaced by another angular displacement detecting mechanism 140. Similar parts are designated by like reference numerals and will not be described. Some of the components in this embodiment are similar to those described in conjunction with the seventh embodiments and therefore designated by like reference numerals.

Referring to FIG. 23, the gear 93 engaged with the gear 56 and the gear 133 engaged with the gear 57 have a common pitch diameter. The gear 93 comprises a steel material or a plastic material and is integrally coupled to the serration shaft 131 by press-fit or bonding. The gear 133 comprises a steel material (or a plastic material having a low frictional coefficient) and is rotatably and slidably supported by the serration shaft 131. The serration shaft 131 has opposite ends rotatably supported through bearings on a reducer casing 141 and a casing cover 142 (corresponding to the casing 41 and the casing cover 52 in the first embodiment, respectively). As illustrated in FIG. 22, the serration shaft 131 is provided with a helical serration having an appropriate angle with respect to the axial line. On the bore side of the gear 133, the inner helical serration 133a is formed at a part of the cylindrical bore to be engaged with the helical serration 131a. In addition, the bush 132 having good lubricity (for example, porous sintered alloy) is press-fitted into the bore of the gear 133.

The ball bearing 107 is externally fitted over the cylindrical shaft portion of the gear 133. A lever 144 is brought into contact with the side surface 107a of an outer ring of the ball bearing 107 to press the ball bearing 107 in the axial direction. The lever 144 has a ring shape. Upward in the figure, the lever 144 has a fulcrum or a supporting point formed at a protruding portion 144a to be brought into contact with a seat metal 143 fixed to the casing 141. Downward in the figure, a protruding plate portion 144c forms an acting point or a driven point of the lever 144. Projections 144b as force points or drive points are formed at both sides of a middle portion of the ring-shaped lever 144 to be brought into contact with the side surface 107a of the outer ring of the ball bearing 107. The seat metal 143 has a head with a groove which serves to prevent the protruding portion 144a from being offset in a lateral direction when the protruding portion 144a is brought into contact therewith. While the gear 133 is moved along the serration shaft 131, the outer ring of the ball bearing 107 fitted to the gear 133 presses the projections 144b (force points) of the lever 144. Then, with the protruding portion 144a as the fulcrum, the protruding plate portion 144c (acting point) of the lever 144 is moved over an enlarged distance. As illustrated in FIG. 24, let a distance between the fulcrum and the force points of the lever 144 be represented by a, a distance b between the fulcrum and the acting point, and the moving distance e of the ball bearing 107, the operating distance f of the acting point is given by:

$f = e \times b/a$.

A rotation stopper pin 145 is fixed on the casing 141. The rotation stopper pin 145 is engaged with a hole 144d in the protruding plate portion 144c of the lever 144 to inhibit the lever 144 from being rotated together with the ball bearing 107. A compression spring 146 is arranged in an urged state between the casing 141 and the protruding plate portion 144c of the lever 144 with the rotation stopper pin 145 as a guide shaft. The pressing force of the compression spring 146 causes, through the lever 144, the helical serration 131a, and the inner helical serration 133a, the pressing force onto the gear 133 in the rotational direction. As a consequence, the backlash between the gears 133 and 57 in one direction can be avoided. Simultaneously, the backlash between the gears 56 and 93 is avoided. It is thus possible to improve angular accuracy in transmission of rotation between the gears.

The displacement of the acting point on the protruding plate portion 144c of the lever 144 is converted through a detection lever 147 into an angular displacement which is measured by a displacement detector 148 attached to the outside of the casing 141. A torsional spring is provided on a detection shaft of the displacement detector 148 so that the detection lever 147 continuously presses the protruding plate portion 144c of the lever 144. Thus, no clearance is produced at a detecting portion.

As described in conjunction with the first embodiment, upon occurrence of the relative angular displacement between the gears 56 and 57, the angular displacement is transformed into the relative angular displacement between the gears 93 and 133. The gear 133 is moved along the helical serration 131a in the axial direction. In FIG. 23, a lower part below the center line J—J of the serration shaft 131 shows the position where the gear 133 approaches the gear 93 because the pedaling torque is not transmitted to the angular displacement mechanism 60 (FIG. 4). On the other hand, an upper part in the figure shows the position where the gear 133 is apart from the gear 93 because the pedaling torque is transmitted. The moving distance e is enlarged by the lever 144 into the distance f which is measured through the detection lever 147 by the displacement detector 148. The displacement detector 148 produces a pedaling torque signal used as a function in controlling motor output.

The gear 133 may be a molded product of a plastic material having a low frictional coefficient. In this case, the bush 132 is not required. Instead, a portion corresponding to the bush 132 is formed as an integral part of the gear.

By minimizing the urging force of the compression spring 146 pressing the lever 144 and allowing only a very small torque to be transmitted to the gears 93 and 133, a sufficient durability is achieved even if the gears comprise a plastic material.

In this embodiment, when the movement of the gear 133 is picked up upon detection of the torque, the projection 144b of the lever 144 is brought into contact with the outer ring of the ball bearing 107 while the gear 133 is rotating. Thus, relative sliding between the protruding portion 144b and the outer ring of the ball bearing 107 is little, even if it is caused. Therefore, the possibility of wear is removed without any specific anti-wear treatment at contacting portions of the lever 144 and the gear 133. This assures a sufficient durability. On the serration shaft 131, the gear 133 is reliably supported by the bush 132 so that the durability is improved in the inner helical serration 133a of the gear 133 and the bearing portion (bush 132, or a plastic bearing having a low frictional coefficient). Thus, offset rotation of the gear 133 is prevented. In addition, no clearance is present in displacement transmitting arrangement from the ball bearing 107 to the displacement detector 148. Simultaneously, since the displacement is enlarged and then transmitted to the detector 148, a control signal can be produced to have a large level while maintaining the accuracy in torque detection. Thus, signal processing in the controller is reliably and easily carried out.

Ninth Embodiment

Figure 25:
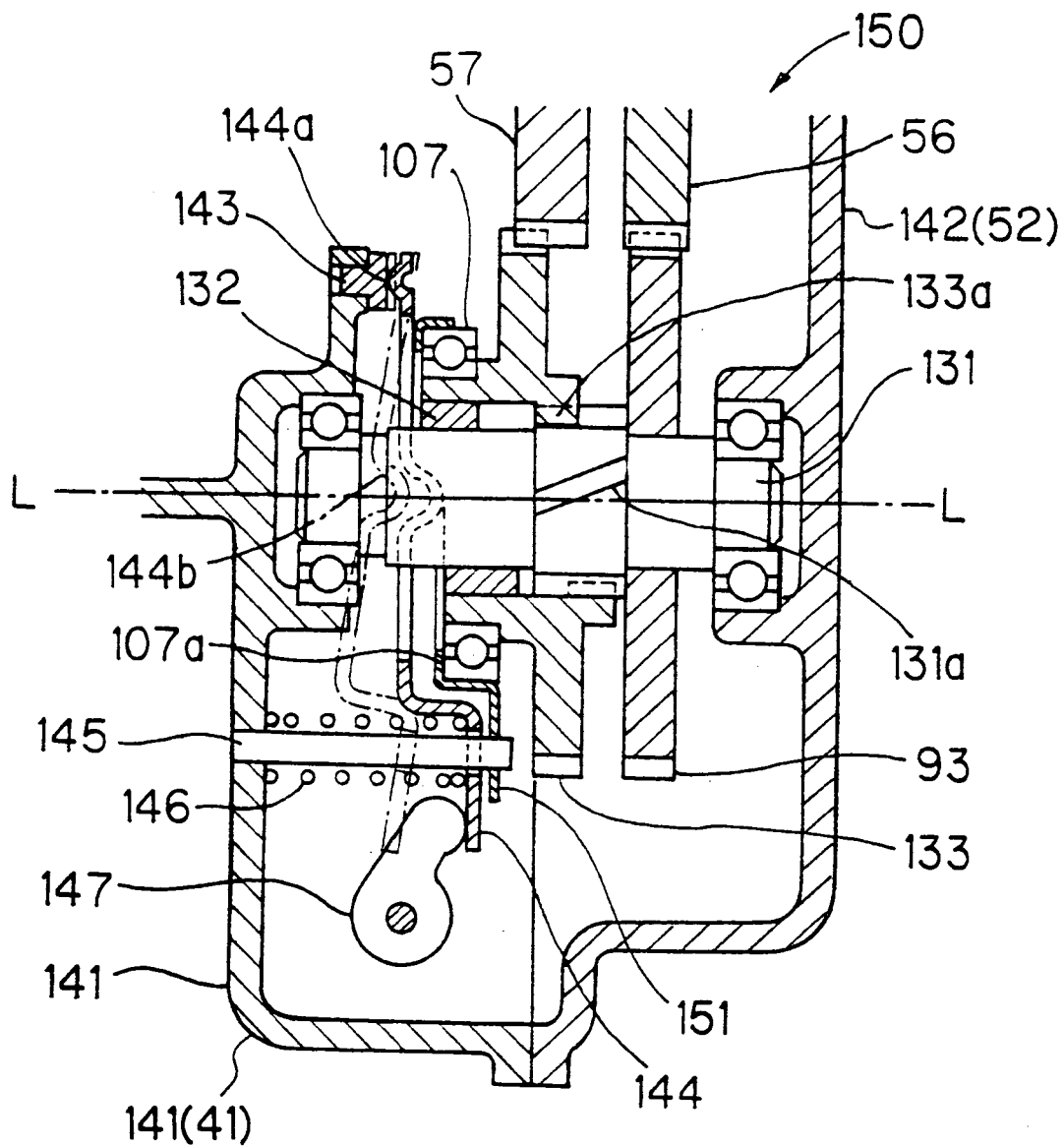
FIG. 25 is a sectional view of a part of an angular displacement detecting mechanism of a driving unit according to a ninth embodiment of this invention.

Referring to FIG. 25, a driving unit according to a ninth embodiment of this invention is similar to that described in conjunction with the eighth embodiment except that a bearing holder ring 151 is externally fitted to the outer ring of the ball bearing 107. Similar parts are designated by like reference numerals and will not be described.

In FIG. 25, a lower part below the center line L—L of the serration shaft 131 shows the position where the gear 133 approaches the gear 93 because the pedaling torque is not transmitted to the angular displacement mechanism 60 (FIG. 4). On the other hand, an upper part in the figure shows the position where the gear 133 is apart from the gear 93 because the pedaling torque is transmitted.

The bearing holder ring 151 is fitted to the outer ring of the ball bearing 107 externally fitted on the shaft of the gear 133. The rotation stopper pin 145 fixed to the casing 141 is engaged with a hole formed in the outer periphery of the bearing holder ring 151 so that the bearing holder ring 151 is allowed to move in the axial direction of the serration shaft 131, but is restricted to move in the rotational direction. The lever 144 is also engaged with the rotation stopper pin 145. However, when the ball bearing 107 is moved, the lever 144 is moved in the same direction earlier than the bearing holder ring 151 so that no interference therebetween is caused.

In this embodiment, when the movement of the gear 133 is picked up by the lever 144 upon detection of the torque, following movement of the outer ring of the ball bearing 107 is inhibited by the bearing holder ring 151 and the rotation stopper pin 145. Therefore, no relative sliding is caused between the protruding portion 144b of the lever 144 and the bearing holder ring 151. The durability in the displacement detecting path can further be improved as compared with the eighth embodiment.

As described in detail in conjunction with several preferred embodiments, this invention uses the planet roller reducer at the reducing section directly coupled to the output shaft of the high-speed electric motor so that vibration and noise are suppressed. In addition, a pinion is formed integrally with the output shaft of the planet roller shaft carrier of the planet roller reducer to form the two-stage reducing gear mechanism so that a sufficient reduction ratio is obtained. Thus, the motor and the two kinds of the reducing mechanisms are integrated into a single unit accommodated in the casing arranged at the position of the pedal hub. With this structure, nothing is protruded around the unit. In addition, the unit is compact and weight distribution to the front and the rear wheels is well balanced.

In case where the planet roller reducer with the motor is used as auxiliary power for the bicycle, the output chain sprocket can be arranged at the same axial position as the ordinary bicycle. Consequently, the driven chain sprocket is also located at an ordinary position.

The relative displacement mechanism providing the relative displacement between the gears in response to the pedaling torque has a mechanical structure such that the electric motor does not start auxiliary driving operation before the pedaling torque reaches a predetermined level or more during running of the bicycle. Therefore, the control system for the electric motor is simplified.

In particular, the relative displacement detecting mechanisms according to the eighth through the eleventh aspects of this invention, the number of components is reduced and the structure is simple so that the production cost can be lowered. In the twelfth and the thirteenth aspects of this invention, the portion subjected to the pressing force of the displacement pickup lever for torque detection is free from relative sliding so as to prevent that portion from being worn. Thus, the durability and the accuracy in torque detection can be improved.

In the relative displacement detecting mechanisms according to the fourteenth and the fifteenth aspects of this invention, the gears for displacement detection can be reliably supported on the serration shaft by the use of the bush. Therefore, the durability of the inner serration portion of the gear and the bearing portion is further improved. The gears for displacement detection are prevented from offset rotation so that the accuracy in torque detection is maintained.

In the relative displacement detecting mechanism described in the fourteenth and the fifteenth aspects of this invention, the gears for displacement detection can be reliably supported on the serration shaft by the use of the bush. Therefore, the durability of the inner serration portion of the gear and the bearing portion is excellent. The gears for displacement detection are prevented from offset rotation and the displacement is enlarged and transmitted to the detector. Thus, the movement of the detected piece in the detector is enlarged so that the large control signal can be produced while the accuracy in torque detection maintained. As a consequence, signal processing in the controller is reliably and easily carried out.

What is claimed is:

1. A driving unit for an electric motor driven bicycle, comprising:

a motor having an output shaft concentric with a crank shaft of a pedal;

a planet roller reducer having a sun roller rotating integrally with said output shaft of the motor;

a second-stage gear reducer for further reducing the rotation of a shaft of said planet roller reducer;

a first one-way clutch interposed in a power transmission path of said second-stage gear reducer;

a driving chain sprocket having a first gear which is concentric with said crank shaft and is engaged with an output shaft of said second-stage gear reducer;

a second gear equal in pitch diameter to said first gear, supported through a bearing on said crank shaft of the pedal, and having a second one-way clutch for transmitting the rotation of said crank shaft to said driving chain sprocket;

an angular displacement mechanism having an elastic member provided in said first gear and a protruding member protruding from said second gear to be engaged with said elastic member, said angular displacement mechanism converting the magnitude of a pedaling torque into angular displacement following deformation of said elastic member; and an angular displacement detecting mechanism for detecting the angular displacement produced in said angular displacement mechanism, wherein, an output torque of the motor is controlled in correspondence to the magnitude of said pedaling torque.

2. A driving unit for an electric motor driven bicycle as claimed in claim 1, wherein said angular displacement mechanism includes, a plurality of long hole portions to which long holes are made to penetrate said first gear to both side surfaces thereof are arranged at an equal interval in a circumferential direction, a plurality of compression springs received in said long holes in one-to-one correspondence, and said protruding member formed on said second gear to be engaged with said compression springs only in a single rotational direction, said compression springs being compressed and shortened in proportion to said pedaling torque to represent relative angular displacement between said first and said second gears.

3. A driving unit for an electric motor driven bicycle as claimed in claim 2, wherein said compression springs are applied with an initial pressure so as to produce no relative angular displacement between said first and said second gears while said pedaling torque is small, thereby restricting the range of energization by said motor.

4. A driving unit for an electric motor driven bicycle as claimed in claim 2 or 3, wherein said angular displacement detecting mechanism includes,
- a pair of gears engaged with said first and said second gears, respectively, and rotated on a common axis,
- a plurality of V groove cams fixed on annular side surfaces of said pair of gears and arranged at an equal interval in a circumferential direction to confront one another,
- a compression spring urged to press said V groove cams against one another, and
- a plurality of rollers each of which is interposed and held in each of parallelopiped cavities defined between cam surfaces of said V groove cams, wherein
  - every confronting ones of said V groove cams being offset from each other, upon occurrence of relative angular displacement between said gears, to force said rollers to climb upward along the cam surfaces so that both gears are separated from each other in an axial direction by a moving distance which is converted by a sliding plate and a lever into displacement to be measured by a displacement detector to produce a motor output control signal.

5. A driving unit for an electric motor driven bicycle, comprising:
- a motor having an output shaft concentric with a crank shaft of a pedal;
- a planet roller reducer having a sun roller rotating integrally with said output shaft of the motor;
- a second-stage gear reducer for further reducing the rotation of a shaft of said planet roller reducer;
- a first one-way clutch interposed in a power transmission path of said second-stage gear reducer;
- a driving chain sprocket having a first gear at a final stage which is concentric with said crank shaft and engaged with an output shaft of said second-stage gear reducer;
- a second gear equal in pitch diameter to said first gear, supported through a bearing on said crank shaft of the pedal, and having a second one-way clutch for transmitting the rotation of said crank shaft to said driving chain sprocket; and
- a torque detecting mechanism having third and fourth gears arranged on a common axis to be engaged with said first and said second gears, respectively, said torque detecting mechanism being responsive to a pedaling torque transmitted through said two pairs of gears for producing axial displacement proportional to a transmission torque between said third and said fourth gears, wherein
  - an output torque of the motor is controlled in correspondence to the magnitude of said pedaling torque.

6. A driving unit for an electric bicycle as claimed in claim 5, wherein said torque detecting mechanism includes,
- a plurality of V groove cams fixed on annular side surfaces of said third and said fourth gears and arranged at an equal interval in a circumferential direction to confront one another,
- a compression spring urged to press said V groove cams against one another, and
- a plurality of rollers each of which is interposed and held in each of parallelopiped cavities defined between cam surfaces of said V groove cams, wherein
  - every confronting ones of said V groove cams being offset from each other, upon occurrence of relative angular displacement between said third and said fourth gears in response to the pedaling torque, to force said rollers to climb upward along the cam surfaces so that said third and said fourth gears are separated from each other in an axial direction by a moving distance which is converted by a sliding plate and a lever into displacement to be measured by a displacement detector to produce a motor output control signal.

7. A driving unit for an electric motor driven bicycle as claimed in claim 6, wherein said compression spring is applied with an initial pressure so as to produce no relative angular displacement between said third and said fourth gears while said pedaling torque is small, thereby restricting the range of energization by said motor.

8. A driving unit for an electric motor driven bicycle as claimed in any one of claims 1 through 3, wherein said angular displacement detecting mechanism includes,
- a helical groove shaft having opposite ends rotatably supported by bearings and a plurality of helical grooves formed in a cylindrical shaft portion extending between said bearings,
- a third gear fixed on said helical groove shaft and engaged with said first gear,
- a fourth gear engaged with said second gear and loosely fitted on said helical groove shaft to be slidable both in a rotational direction and in an axial direction, said fourth gear having a plurality of dead-ended grooves equal in number to said helical grooves of said helical groove shaft and formed inside of a stepped portion of an inner loose-fit cylinder of said fourth gear in parallel to axial lines of said helical grooves,
- a plurality of balls equal in number to said helical grooves and engaged with both said helical grooves of the helical groove shaft and said dead-ended grooves of the fourth gear,
- ball holding means for holding said balls inside of said dead-ended grooves of the fourth gear,
- urging means for urging said fourth gear towards said third gear, and
- detecting means for detecting a moving distance of said fourth gear in the axial direction to produce a motor output control signal.

9. A driving unit for an electric motor driven bicycle as claimed in claim 8, wherein a combination of said ball holding means, said urging means, and said detecting means includes,
- an annular plate fitted to the stepped portion of the inner cylinder of said fourth gear, and
- a compression spring arranged between said annular plate and a seating plate fixed to said helical groove shaft and urged in a direction of pressing said fourth gear towards said third gear, wherein
  - said fourth gear being angularly offset from said third gear upon occurrence of relative angular displacement between said first and said second gears in correspondence to the magnitude of said pedaling torque so that said fourth gear is pushed by said balls moving along said helical grooves to move in an axial direction by a moving distance, said moving distance being picked up by a lever in contact with the side surface of said fourth gear as displacement which is detected by a displacement detector to produce a motor output control signal.

10. A driving unit for an electric motor driven bicycle as claimed in any one of claims 1 through 3, wherein said angular displacement detecting mechanism includes, a helical groove shaft having opposite ends rotatably supported by bearings and a plurality of helical grooves formed in a cylindrical shaft portion extending between said bearings, a third gear fixed on said helical groove shaft and engaged with said first gear, and a fourth gear engaged with said second gear and loosely fitted on said helical groove shaft to be slidable both in a rotational direction and in an axial direction, said fourth gear having a plurality of protrusions equal in number to said helical grooves of said helical groove shaft and having a helical angle equal to that of said helical grooves, said protrusions being formed in an inner loose-fit cylinder of said fourth gear to be engaged with said helical grooves, wherein said angular displacement detecting mechanism further includes, detecting means for detecting, when said fourth gear is angularly offset from said third gear upon occurrence of a relative angular displacement between said first and said second gears in correspondence to the magnitude of said pedaling torque, a moving distance of said fourth gear moving along said helical grooves to produce a motor output control signal.

11. A driving unit for an electric motor driven bicycle as claimed in claim 10, wherein said detecting means includes a lever in contact with the side surface of said fourth gear, said lever picking up the moving distance of said fourth gear moving along said helical grooves as displacement which is detected by a displacement detector to produce the motor output control signal.

12. A driving unit for an electric motor driven bicycle as claimed in claim 8, wherein said angular displacement detecting mechanism further includes, a ball bearing externally fitted over a stepped cylindrical shaft portion of said fourth gear, a bearing holder ring externally fitted over said ball bearing, a compression spring arranged between said bearing holder ring and a casing and urged in a direction of pressing said fourth gear towards said third gear, and a rotation stopper shaft fixed to said casing in parallel to said helical shaft to inhibit rotation of said bearing holder ring, wherein said fourth gear being angularly offset from said third gear upon occurrence of a relative angular displacement between said first and said second gears in correspondence to the magnitude of said pedaling torque so that said fourth gear is pushed by said balls moving along said helical grooves and is moved in an axial direction by a moving distance, said moving distance being picked up, through said ball bearing and said bearing holder ring, by a lever in contact with the side surface of said fourth gear as displacement which is detected by a displacement detector to produce a motor output control signal.

13. A driving unit for an electric motor driven bicycle as claimed in claim 10, wherein said angular displacement detecting mechanism further includes a ball bearing externally fitted over a stepped cylindrical shaft portion of said fourth gear, a bearing holder ring externally fitted over said ball bearing, a compression spring arranged between said bearing holder ring and a casing and urged in a direction of pressing said fourth gear towards said third gear, and a rotation stopper shaft fixed to said casing in parallel to said helical shaft to inhibit rotation of said bearing holder ring, wherein said fourth gear being angularly offset from said third gear upon occurrence of relative angular displacement between said first and said second gears in correspondence to the magnitude of said pedaling torque so that said fourth gear is moved in an axial direction by a moving distance, said moving distance being picked up, through said ball bearing and said bearing holder ring, by a lever in contact with the side surface of said fourth gear as displacement which is detected by a displacement detector to produce a motor output control signal.

14. A driving unit for an electric motor driven bicycle as claimed in any one of claims 1 through 3, wherein said angular displacement detecting mechanism includes, a serration shaft having opposite ends rotatably supported by bearings and a cylindrical shaft portion extending between said bearings with a helical serration portion formed on said cylindrical shaft portion, a third gear fixed on said serration shaft and engaged with said first gear, a fourth gear engaged with said second gear with a bush internally fitted in an inner cylinder of said fourth gear so that said fourth gear is loosely fitted to said serration shaft to be slidable both in the rotational direction and in the axial direction, said fourth gear being provided with an inner serration formed in the inner cylinder with a helical angle equal to that of said helical serration portion to be engaged with said helical serration portion of the serration shaft, a ball bearing externally fitted over a stepped cylindrical shaft portion of said fourth gear, a bearing holder ring externally fitted over said ball bearing, a compression spring arranged between said bearing holder ring and a casing and urged in a direction of pressing said fourth gear towards said third gear, and a rotation stopper shaft fixed to said casing in parallel to said helical shaft to inhibit rotation of said bearing holder ring, wherein said fourth gear being angularly offset from said third gear upon occurrence of a relative angular displacement between said first and said second gears in correspondence to the magnitude of said pedaling torque so that said fourth gear is moved along said helical serration by a moving distance, said moving distance being picked up, through said ball bearing and said bearing holder ring, by a lever in contact with the side surface of said fourth gear as displacement which is detected by a displacement detector to produce a motor output control signal.

15. A driving unit for an electric motor driven bicycle as claimed in claim 14, wherein said angular displacement detecting mechanism includes, instead of said fourth gear engaged with said second gear with said bush internally fitted therein and loosely fitted to said serration shaft to be slidable, a fourth gear of a low frictional coefficient engaged with said second gear and loosely fitted to the shaft portion of said serration shaft to be slidable both in the rotational direction and in the axial direction, said fourth gear being provided with an internal serration formed at a part of the same inner cylinder to be engaged with said helical serration of the serration shaft.

16. A driving unit for an electric motor driven bicycle as claimed in any one of claims 1 through 3, wherein said angular displacement detecting mechanism includes, a serration shaft having opposite ends rotatably supported by bearings and a cylindrical shaft portion extending between said bearings with a helical serration portion formed on said cylindrical shaft portion, a third gear fixed on said serration shaft and engaged with said first gear, a fourth gear engaged with said second gear with a bush internally fitted in an inner cylinder of said fourth gear so that said fourth gear is loosely fitted to said serration shaft to be slidable both in the rotational direction and in the axial direction, said fourth gear being provided with an inner serration formed in the inner cylinder with a helical angle equal to that of said helical serration portion to be engaged with said helical serration portion of the serration shaft, a ball bearing externally fitted over a stepped cylindrical shaft portion of said fourth gear, a lever including a ring-shaped plate having a fulcrum or a supporting point formed at one protruding end thereof to be kept in contact with a casing, force points comprising projections formed on both sides of said ring-shaped plate to be brought into contact with a side surface of an outer ring of said ball bearing, and an acting point formed on the other protruding end opposite to said fulcrum, a rotation stopper pin fixed on said casing in parallel to said serration shaft and inserted into a hole formed on the other protruding end of said lever, a compression spring urging said lever through said projections as the force points to press said ball bearing on the shaft of said fourth gear, and a displacement detector for converting a moving distance of said acting point of the lever into angular displacement to be detected, wherein said fourth gear being angularly offset from said third gear upon occurrence of a relative angular displacement between said first and said second gears in correspondence to the magnitude of said pedaling torque so that said fourth gear is moved along said helical serration by a moving distance, said moving distance being enlarged by said lever to provide displacement of said acting point of the lever, said displacement being detected by a displacement detector to produce a motor output control signal.

17. A driving unit for an electric motor driven bicycle as claimed in claim 16, wherein said angular displacement detecting mechanism further includes, a bearing holder ring externally fitted over said ball bearing on said stepped cylindrical shaft portion of said fourth bearing and having a rotational direction restricted by said rotation stopper pin fixed on said casing, said projections being brought into contact with the side surface of the outer ring of said ball bearing through said bearing holder ring so that an axial moving distance of said fourth gear is enlarged by said lever.

18. A motor power assistance system for a bicycle having a crank shaft, pedals for rotating the crank shaft, and a sprocket for transmitting rotation of the crankshaft to a driving wheel, the system comprising:

a first gear connected to the crank shaft through a first one-way clutch;

a second gear connected to said sprocket;

a motor provided coaxially with the crank shaft and transmitting output torque to said second gear through a second one-way clutch;

a torque transmitting unit which transmits torque at least from said second gear to said first gear while permitting a relative displacement therebetween;

an angular displacement detecting unit which detects the angular displacement between said first and second gears; and a control unit which controls an out put of said motor based on said detected angular displacement.

19. A motor power assistance system of claim 18, further comprising: a speed reducer provided between said motor and said second one-way clutch.

20. A motor power assistance system of claim 19, wherein said speed reducer includes, a first speed reducer provided coaxially with the crank shaft and, a second speed reducer which further reduces output speed of said first speed reducer.

* * * * *